United States Patent
Boguraev et al.

(10) Patent No.: US 6,553,373 B2
(45) Date of Patent: *Apr. 22, 2003

(54) METHOD FOR DYNAMICALLY DELIVERING CONTENTS ENCAPSULATED WITH CAPSULE OVERVIEWS CORRESONDING TO THE PLURALITY OF DOCUMENTS, RESOLVING CO-REFERENTIALITY RELATED TO FREQUENCY WITHIN DOCUMENT, DETERMINING TOPIC STAMPS FOR EACH DOCUMENT SEGMENTS

(75) Inventors: Branimir Boguraev, Los Gatos, CA (US); Rachel Katherine Emma Bellamy, Los Gatos, CA (US); Yin Yin Wong, San Francisco, CA (US)

(73) Assignee: Apple Computer, Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/998,406

(22) Filed: Nov. 29, 2001

(65) Prior Publication Data

US 2002/0133480 A1 Sep. 19, 2002

Related U.S. Application Data

(63) Continuation of application No. 08/972,935, filed on Nov. 18, 1997, now Pat. No. 6,353,824.

(51) Int. Cl.[7] .............................................. G06F 17/30
(52) U.S. Cl. ................... 707/5; 707/1; 707/3; 707/102; 707/104.1; 707/501.1; 707/530; 707/531; 707/513; 704/9
(58) Field of Search .................... 707/1–10, 100–104.1, 707/200–205, 500.1, 501.1, 511–515, 907–908, 530–531; 713/200; 709/240–245; 704/9–10

(56) References Cited

U.S. PATENT DOCUMENTS 5,768,580 A * 6/1998 Wical ......................... 707/102
5,963,208 A * 10/1999 Dolan et al. ................ 345/760

(List continued on next page.)

OTHER PUBLICATIONS

Soumen Chakrabarti, Integrating the document object model with hyperlinks for enhanced topic distillation and information extraction, WWW 10, May 2001, Hong Kong, ACM., 7 pages.*

(List continued on next page.)

Primary Examiner—Srirama Channauajjala
(74) Attorney, Agent, or Firm—Sawyer Law Group LLP

(57) ABSTRACT

A method for the dynamic presentation of the contents of a plurality of documents on a display is disclosed. The method comprises receiving a plurality of documents and providing a plurality of topically rich capsule overviews corresponding to the plurality of documents. The method also includes dynamically delivering document content encapsulated in the plurality of capsule overviews. In so doing, the method in accordance with the present invention can present thematic capsule overviews of the documents to users. The capsule overviews, delivered in a variety of dynamic presentation modes, allow the user to quickly get a sense of what a document is about, and decide whether they want to read it in more detail. In a preferred embodiment, the capsule overviews include a containment hierarchy which relates the different information levels in a document together, and which includes a collection of highly salient topic stamps embedded in layers of progressively richer and more informative contextualized text fragments. The novel presentation metaphors which the invention utilizes are based on notions of temporal typography, in particular for exploiting the interactions between form and content.

47 Claims, 11 Drawing Sheets

U.S. PATENT DOCUMENTS

| | | | |
|---|---|---|---|
| 6,185,592 B1 | | 2/2001 | Boguraev et al. ........... 707/531 |
| 6,308,187 B1 | * | 10/2001 | DeStefano ................... 345/618 |
| 6,353,824 B1 | | 3/2002 | Boguraev et al. .............. 707/5 |
| 6,359,633 B1 | * | 3/2002 | Balasubramaniam et al. . 345/738 |
| 6,363,378 B1 | * | 3/2002 | Conklin et al. ................. 704/9 |
| 6,405,197 B2 | * | 6/2002 | Gilmour ....................... 705/37 |
| 6,417,873 B1 | * | 7/2002 | Fletcher et al. ............. 345/738 |

OTHER PUBLICATIONS

Einat et al., Automatically summarising web sites–is there a way around it?, 9th international conference on information and knowledge management Washington, DC, 2000, pp 211–220.*

Mochizuki et al., A comparison of summarization methods based on task-based evaluation, Proc of LREC 2000, pp 633–639.*

Boguraev, Branimir et al., "Salience–Based Content Charaterisation of Text Documents," 9 pages.

Kennedy, Christopher et al., "Anaphora for Everyone: Pronominal Anaphora Resolution without a Parser," To be presented at the International Conference on Computational Linguistics, Aug. 5–9, 1996, Copenhagen, Denmark, 6 pages.

Kennedy, Christopher et al., Anaphora in a Wider Context: Tracking Discourse Referents, To be presented at European Conference on Artificial Intelligence, Aug. 11–16, 1996, pp. 582–586.

* cited by examiner

"ONE DAY, everything Bill Gates has sold you up to now, whether it's Windows 95 or Windows 97, will become obsolete," declares Gilbert Amelio, the boss at Apple Computer. "Gates is vulnerable at that point. And we want to make sure we're ready to come forward with a superior answer."

Bill Gates vulnerable? Apple would swoop in and take Microsoft's customers? Ridiculous! Impossible! In the last fiscal year, Apple lost $816 million; Microsoft made $2.2 billion. Microsoft has a market value thirty times that of Apple.

Outlandish and grandiose as Amelio's idea sounds, it makes sense for Apple to think in such big, bold terms. Apple is in a position where standing pat almost certainly means slow death.

It's a bit like a patient with a probably terminal disease deciding to take a chance on an untested but promising new drug. A bold strategy is the least risky stategy. As things stand, customers and outside software developers alike are deserting the company. Apple needs something dramatic to persuade them to stay aboard. A radical redesign of the desktop computer might do the trick. If they think the redesign has merit, they may feel compelled to get on the bandwagon lest it leave them behind.

Lots of "ifs," but you can't accuse Amelio of lacking vision. Today's desktop machines, he says, are ill-equipped to handle the coming power of the Internet. Tomorrow's machines must accommodate rivers of data, multimedia and multitasking (juggling several tasks simultaneously).

We're past the point of upgrading, he says. Time to scrap your operating system and start over. The operating system is the software that controls how your computer's parts (memory, disk drives, screen) interact with applications like games and Web browsers. Once you've done that, buy new applications to go with the reengineered operating system.

Amelio, 53, brings a lot of credibility to this task. His resume includes both a rescue of National Semiconductor from near-bankruptcy and 16 patents, including one for co-inventing the charge-coupled device.

But where is Amelio going to get this new operating system? From Be, Inc., in Menlo Park, Calif., a half-hour's drive from Apple's Cupertino headquarters, a hot little company founded by ex-Apple visionary Jean-Louis Gassee. Its BeOS, now undergoing clinical trials, is that radical redesign in operating systems that Amelio is talking about. Married to hardware from Apple and Apple cloners, the BeOS just might be a credible competitor to Microsoft's Windows, which runs on IBM-compatible hardware.

FIG. 4

METHOD FOR DYNAMICALLY DELIVERING CONTENTS ENCAPSULATED WITH CAPSULE OVERVIEWS CORRESONDING TO THE PLURALITY OF DOCUMENTS, RESOLVING CO-REFERENTIALITY RELATED TO FREQUENCY WITHIN DOCUMENT, DETERMINING TOPIC STAMPS FOR EACH DOCUMENT SEGMENTS

CROSS-REFERENCE TO RELATED APPLICATIONS

The present application is a continuation application of application Ser. No. 08/972,935, is now U.S. Pat. No. 6,353,824 entitled "METHOD FOR DYNAMIC REPRESENTATION OF THE CONTENTS OF TOPICALLY RICH CAPSULE OVERVIEWS CORRESPONDING TO A PLURALITY OF DOCUMENTS, RESOLVING CO-REFERENTIALITY IN DOCUMENT SEGMENTS," filed on Nov. 18, 1997 and assigned to the same Assignee as the present application.

FIELD OF THE INVENTION

The present invention relates generally to a system and method for reviewing documents. More particularly, the present invention relates to presentation of documents in a manner that allows the user to quickly ascertain their contents.

BACKGROUND OF THE INVENTION

Documents obtained via an electronic medium (i.e., the Internet or on-line services, such as AOL, Compuserve or other services) are often provided in such volume that it is important to be able to summarize them. Oftentimes, it is desired to be able to quickly obtain a brief (i.e., a few sentences or a paragraph length) summary of the document rather than reading it in its completeness. Most typically, such documents span several paragraphs to several pages in length. The present invention concerns itself with this kind of document, hereinafter referred to as average length document.

Present day summarization technologies fall short of delivering filly informative summaries of documents. To some extent, this is so because of shortcomings of the state-of-the-art in natural language processing; in general, the issue of how to customize a summarization procedure for a specific information seeking task is still an open one. However, given the rapidly growing volume of document-based information on-line, the need for any kind of document abstraction mechanism is so great that summarization technologies are beginning to get deployed in real world situations.

The majority of techniques for "summarization", as applied to average-length documents, fall within two broad categories. A class of techniques mine a document for certain pre-specified pieces of information, typically defined a priori, on the basis of fixing the most characteristic features of a known domain of interest. Other approaches rely, in effect, on 're-using' certain fragments of the original text; these have been identified, typically by some-similarity metric, as closest in meaning to the whole document. This categorization is not a rigid one: a number of approaches (as exhibited, for instance, in a recent workshop on *Association for Computational Linguistics*, "Proceedings of a Workshop on Intelligent, Scalable, Text Summarization," Madrid, Spain, 1997) use strong notions of topicality (B. Boguraev and C. Kennedy, "Salience-based content characterization of text documents," in *Proceedings of ACL '97 Workshop on Intelligent, Scalable Text Summarization*, Madrid, Spain, 1997), (E. Hovy and C. Y. Lin, "Automated text summarization in SUMMARIST," in *Proceedings of ACL '97 Workshop on Intelligent, Scalable Text Summarization*, Madrid, Spain, 1997), lexical chains (R. Barzilay and M. Elhadad, "Using lexical chains for text summarization," in *Proceedings of ACL '97 Workshop on Intelligent, Scalable Text Summarization*, Madrid, Spain, 1997), and discourse structure (D. Marcu, "From discourse structures to text summaries", in *Proceedings of ACL '97 Workshop on Intelligent, Scalable Text Summarization*, Madrid, Spain, 1997), (U. Hahn and M. Strube, "Centered segmentation: scaling up the centering model to global discourse structure," in *Proceedings of ACL-EACL/97, 35th Annual Meeting of the Association for Computational Linguistics and 8th Conference of the European Chapter of the Association for Computational Linguistics*, Madrid, Spain, 1997), thus laying claim to newer sets of methods.

Still, at a certain level of abstraction, all approaches share a fundamental similarity: summarization methods today rely, in essence, on substantial data reduction over the original document source. Such a position leads to several usability questions.

Given the extracted fragments which any particular method has identified as worth preserving, what is an optimal way of encapsulating these into a coherent whole, for presenting to the user? Acknowledging that different information management tasks may require different kinds of summary, even from the same document, how should the data discarded by the reduction process be retained, in case a reference is necessary to a part of the document not originally included, in the summary? What are the trade-offs in fixing the granularity of analysis: for instance, are sentences better than paragraphs as information-bearing passages, or are phrases even better? Of particular importance to this invention is the question of "user involvement." From the end-user's point of view, making judgements, on the basis of a summary, concerning what a document is about and whether to pay it closer attention would engage the user in a sequence of actions: look at the summary, absorb its semantic impact, infer what the document might be about, decide whether to consult the source, somehow call up the full document, and navigate to the point(s) of interest. Given that this introduces a serious amount of cognitive and operational overhead, what are the implications for the user when they are faced with a large, and growing, number of documents to deal with on a daily basis?

These are only some of the questions concerning the acceptability of summarization technology by end users. There is particular urgency, given the currently evolving notion of "infornmation push", where content arriving unsolicited, and in large quantities, at individual workstations threatens users with real and immediate information overload. To the extent that broad coverage summarization techniques are beginning to get deployed in real world situations, it is still the case that these techniques are based primarily on sentence extraction methods. In such a context, the above questions take on more specific interpretations. Thus, is it appropriate to concatenate together the sentences extracted as representative—especially when they come from disjoint parts of the source document? What could be done, within a sentence extraction framework, to ensure that all 'themes' in a document get represented by the set of sentences identified by the technology? How can the jarring effect of 'dangling' (and unresolved) references in the selection—without any obvious means of identifying the referents in the original text—be overcome? What mechanisms could be developed for offering the user additional information from the document, for more focused attention to detail? What is the value of the sentence, as a basic information-bearing unit, as a window into a multi-document space?

To illustrate some of these issues, consider several examples from an operational news tracking site: the News Channel page of Excite, an information vendor and a popular search engine host for the World Wide Web, which is available via the "Ongoing Coverage" section of the news tracking page, (http://nt.excite.com). Under the heading of Articles about IRS Abuses Alleged, some entries read:

EXAMPLE 1

RENO ON Sunday/Reform Taxes the . . .
The problem, of course, is that the enemies of the present system are all grinding different axes. How true, how true, and ditto for most of the people who sit on the Finance Committee. (First found: Oct. 18, 1997)

EXAMPLE 2

Scheduled IRS Layoffs For 500 Are . . .
The Agency's original plan called for eliminating as many as 5,000 jobs in field offices and at the Washington headquarters. "The way this has turned out, it works to the agency's advantage, the employees' advantage and the union's advantage." (First found: Oct. 17, 1997.)

Both examples present summaries as sentences which almost seamlessly follow one another. While this may account for acceptable readability, it is at best misleading, as in the original documents these sentences are several paragraphs apart. This makes it hard to know that the references to "How true, how true", in the first example, and "The way this has turned out", in the second, are not whatever might be mentioned in the preceding summary sentences, but are, in fact, hidden somewhere in the original text of the documents. Opening references to "The problem" and "the agency" are hard to resolve. The thrust of the second article—namely that there is a reversal of an anticipated situation—is not at all captured: it turns out that the missing paragraphs between the summary sentences discuss how the planned 5,000 layoffs have been reduced to "4,000, then 1,400 and finally settled at about 500", and that "now, even those 500 workers will not be cut". As it turns out, some indication to this effect might have been surmised from the full title of the article, Scheduled IRS Layoffs For 500 Are Canceled; unfortunately, this has been truncated by a data reduction strategy which is insensitive to notions of linguistic phrases, auxiliary verb constructions, mood, and so forth.

In the extreme case, such summaries can range from under-informative (as illustrated by the first example above), to misleading (the second example), to plainly devoid of any useful information. Another example from the same site reads:

EXAMPLE 3

Technology News from Wired News
This is more than 500 times thinner than a human hair.
"Don't expect one in a present under your Christmas tree this year."

Accordingly, a particular problem that must be addressed is how to "fill in the gaps" which the data reduction process necessarily introduces as a summary is constructed by choosing certain fragments from the original source. Presently, known ways for filling such gaps, assuming of course these are even perceived, is by the active user involvement of requesting the entire document.

Currently, there is a relatively rigid mechanism typically sensitive to a mouse click, or some similar interactive command, with the simple semantics of "bring up the entire document, possibly with the point of view focused on the particular sentence of the summary which received the click, presented in its natural document context, and maybe highlighted". Clearly, having a richer data structure would facilitate greater flexibility in interactions with what would be, in effect, a whole range of dynamically reconfigured summaries at different level of granularity and detail.

There is still one problem, however: the process of filling in the gaps requires active user involvement. In principle there is nothing wrong with this. In practice, real information management environments involve working with a large number of documents. It is far from clear that users will have the energy, bandwidth, dedication, and concentration required to assess, absorb, and act upon summaries for each one of these documents, by clicking their way through each member of a long static list.

Accordingly, what is needed is a system and method for presenting a plurality of documents to a user in a more expeditious fashion than when utilizing conventional techniques. In a preferred embodiment, the system and method should be able to analyze documents with multiple topics. The analysis would typically be used to produce summary-like abstractions of the documents at varying levels of granularity and detail. The system and method should be easy to implement and cost-effective. Furthermore, the document presentation should contain relevant information from throughout the document, not just a selection of sentences that may miss significant topics. The system and method should allow the presentation to be sensitive to multilayer analysis, should be able to present salient and contextualized highlights of a document and should make the document available to the user seamlessly, by an active user interface. Finally, the presentation should be adaptable such that a user decides whether he/she desires to be actively involved in the presentation. The present invention addresses these needs.

SUMMARY OF THE INVENTION

A method and system for the dynamic presentation of the contents of a plurality of documents on a display is disclosed. The method and system comprises receiving a plurality of documents and providing a plurality of topically rich capsule overviews corresponding to the plurality of documents. The method and system also includes dynamically delivering document content encapsulated in the plurality of capsule overviews.

In so doing, a system and method in accordance with the present invention can present thematic capsule overviews of the documents to users. A capsule overiew is derived for the entire document, which will depict the core content of an average length article in a more accurate and representative manner than utilizing conventional techniques. The capsule overviews, delivered in a variety of dynamic presentation modes, allow the user to quickly get a sense of what a document is about, and decide whether they want to read it in more detail. If so, the system and method greatly facilitate the process of focused navigation into the parts of the document which may be of particular interest to the user.

In a preferred embodiment, the capsule overviews include a containment hierarchy which relates the different information levels in a document together, and which includes a collection of highly salient topic stamps embedded in layers of progressively richer and more informative contextualized text fragments.

The novel presentation metaphors which the invention utilizes are based on notions of temporal typography, in particular for exploiting the interactions between form and content.

BRIEF DESCRIPTION OF THE DRAWINGS

FIG. 4 is an example of an article and its segmentation into topically separate sections.

DESCRIPTION OF THE INVENTION

The present invention relates to the rapid presentation of the content of an average length document. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein. A system and method in accordance with the present invention would typically be utilized in a conventional computer system.

TABLE OF CONTENTS
1. Overview
2. Dynamic Presentation of Document Content
   2A. Capsule Overviews
   2B. Salience-Based Content Characterization
   2C. Anaphora Resolution and Local Salience
   2D. Discourse Salience and Capsule Overview
3. Capsule Overviews as Document Abstractions
4. Filling in the Gaps: User Involvement
5. Document Characterization by Topics
   5A. Capsule Overview Example
6. Temporal Typography for Dynamic Document Delivery
7. Visualization of Document Content
8. Dynamic Document Viewers
   8A. TopicsTicker Viewer
   8B. Rapid Serial Visual Presentation (RSVP) Viewer
   8C. ViewTool Viewer
   8D. Viewer Summary 1. Overview A system and method in accordance with the present invention would typically be utilized in a conventional computer system.

Figure 1:
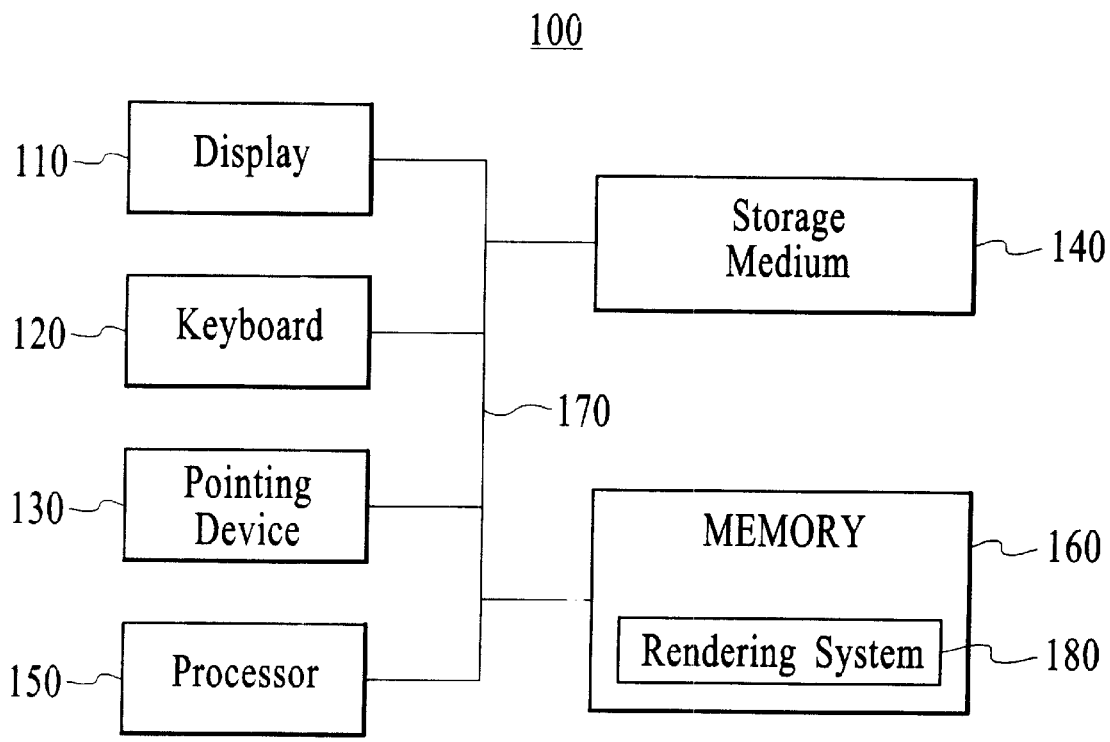
FIG. 1 is a block diagram illustrating a conventional computer system that serves as one type of operating environment for the present invention.

FIG. 1 is a block diagram illustrating a conventional computer system 100, which serves as one type of operating environment for the present invention. The computer system 100 includes a display 110, a keyboard 120, a pointing device 130, a storage medium 140, a processor 150, and a memory 160, which are all connected by a bus 170. The processor 150 operates in conjunction with the memory 160, which are all connected by a bus 170. The processor 150 operates in conjunction with the memory 160 to execute a rendering system 180 that enables the processor 150 to provide, and present, the content characterization from text files stored in some form of computer-readable medium, such as a CD-ROM, or from a network. One of ordinary skill in the art should also recognize that the present invention could be utilized in a variety of data processing systems, and in particular, display devices, and its use would be within the spirit and scope of the present invention. For example, the present invention could be utilized in Network Computers (NC) and their use would be within the spirit of the present invention. In another example, the present invention could be implemented by a server utilizing a technique in accordance with the invention to provide content characterization and a client could provide the resultant display.

The present invention provides a method and system for utilizing novel presentation metaphors of documents that enables users to rapidly skim the documents in order to get the "gist" of their contents. This is accomplished through the dynamic presentation of topically-rich "capsule overviews" of documents. The concept of capsule overviews is described fully in U.S. application Ser. No. 08/974,079, is now U.S. Pat. No. 6,185,592 entitled, "A System and Method for Characterizing Content of Text Documents" filed on Nov. 18, 1997, and assigned to the assignee of the present application which is incorporated by reference in its entirety herein.

By utilizing the capsule overviews of documents derived by a system and method in accordance with the teachings of the above identified application, a system and method in accordance with the present invention can offer an entirely novel approach to the information overload problem. Using topically-rich capsule overviews, a system and method in accordance with the present invention can present thematic outlines of the documents to users. These overviews allow the user to quickly get a sense of what a document is about, decide whether they want to read it in more detail, and quickly navigate to the point(s) of document of particular interest to them. The following discussion will describe with particularity the dynamic presentation of document content for average length documents.

2. Dynamic Presentation of Document Content

Figure 2:
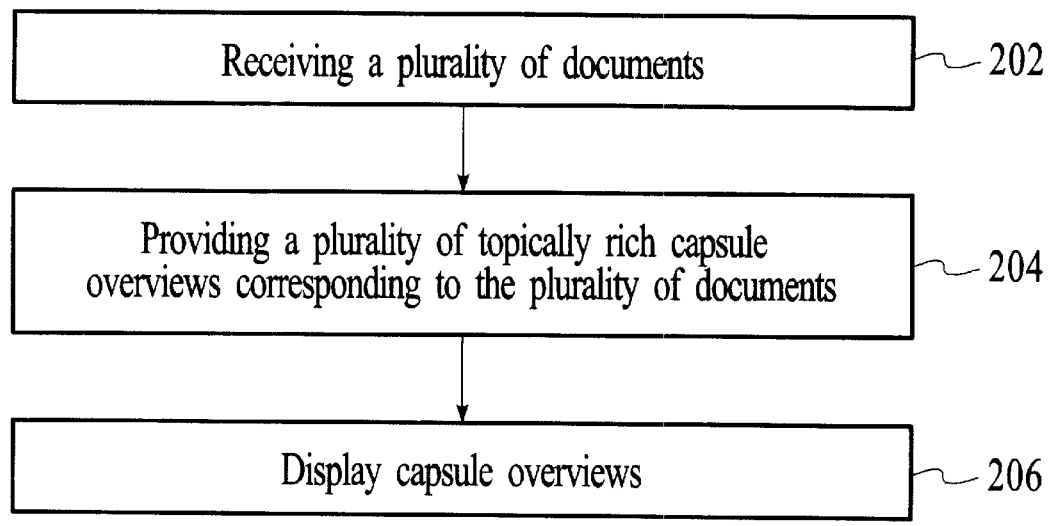
FIG. 2 is a simple flow chart illustrating a method for the dynamic presentation of a plurality of documents in accordance with the present invention.

FIG. 2 is a simple flow chart illustrating a method for the dynamic presentation of a plurality of documents in accordance with the present invention. As is seen, first a plurality of documents are received by a data processing system or the like, via step 202. Next, a plurality of topically rich capsules overviews which corresponds to the plurality of documents, via step 204. Finally a plurality of documents are presented, via step 206. As before mentioned, by utilizing the above-described capsule overviews of documents, a system and method in accordance with the present invention can offer an effective solution to the information overload problem.

The solution in accordance with the present invention to the problem of effectively communicating to the end user the 'gist' of an on-line document, or of a collection of on-line documents, is based on the idea of relating form and content, by means of dynamic visual treatment of written language, or temporal typography. Only recently has the possibility of escaping the static and rigid constraints of writing on paper been fully appreciated. Wong, in *Temporal Typography, Characterization of Time-Varying Typographic Forms* (Master's thesis, MIT Media Lab, 1995), has stated: "Imagine looking at a small area on a computer screen. Words appear and disappear on the screen one by one. As they appear, meaning is expressed as forms change dynamically over time. The combined effect of the message, form and rhythm express a tone of voice, emotion or personality as if you hear a person speak. Although the two mediums, spoken and written words, are vastly different, the analogy may give you a sense of the expressive potential of temporal typography."

The notion, essentially, is to relate highlights of the core meaning of a message to ways of visually enhancing their impact, or at least mimicking (some of) their semantic load. In the immediate context of this disclosure, this translates to questions of what might be appropriate visual metaphors for representing semantic objects like topical phrases, shifts in discourse structure, or contextualization of information-bearing phrasal units.

There are several appealing aspects to dynamically presenting abstractions of document content. The user need not be actively involved: as documents arrive at the desktop, they can be analyzed and the resulting content abstractions can be displayed autonomously. Should the user have the time or inclination to focus on a particular document, interactive controls will be at their disposal; alternatively, each new arrival can be presented under its own schedule, followed by another, and so on. The presentation cycle can be customized to make use of arbitrary combinations of granularity of expressiveness. Notions like semantic highlights and demarcation of context are easily mapped onto visual metaphors, and thus naturally support the expression of content by means of variations of form. Cognitively, short phrases with high semantic load are amenable to punctuated display following a natural rhythm of visual perception.

In summary, delivering document content abstractions dynamically makes it possible to fully exploit a variable depth analysis of documents (which will be discussed in detail below), maintains synchronicity with the continuous flow of information into one's personal workspace, and allows for smooth integration of passive absorption of the analyses by the end-user with active participation in more focused document perusal.

The following discussion in accordance with the present invention highlights a document analysis technology which seeks to derive document content characterizations designed to exhibit the semantic properties described above:
- collections of highly salient topical phrases,
- embedded in layers of progressively richer and more informative contextualized text fragments,
- with contexts calculated as meaningful fragments defined by a containment hierarchy of information-bearing phrasal units, and
- organized as capsule overviews which track the occurrence of topical phrases and other discourse referents across the document discourse.

Next, some essential features of temporal typography are described, as it relates to dynamic delivery of document content. These lead into some conclusions about interfaces for content visualization and, accordingly, a range of viewers designed for the purposes of rapid skimming of on-line documents in order to get the 'gist' of their contents is presented. First, however, the concept of topically-rich capsule overviews is discussed in some detail.

2A. Capsule Overviews

A capsule overview is not a true summary, in that it does not attempt to convey document content as a sequence of sentences. Instead, it is a semi-formal and normalized representation of the document, derived after a process of data reduction over the original text.

Through capsule overviews, a document's content is characterized in a way that is representative of the full flow of the document. This is in contrast to passage extraction techniques, which typically highlight only certain fragments. Also, capsule overviews are derived by carrying out linguistically intensive analysis of the text in a document, which seeks semantic prominence of linguistics expressions, rather than just occurrence of certain pre-specified, or highly frequent, words and phrases—thus the system and method described here can be applied to any document, independent of domain, style or genre.

A capsule overview is not an instantiated template. A primary consideration of the content characterization system and method described here is that they should not be specific to any document source or type. A capsule overview is a coherently presented list of linguistic expressions which refer to the most prominent objects mentioned in the document, i.e., its topic stamps, and furthermore provide richer specification of the relational contexts (e.g., verb phrases, minimal clauses) in which these expressions appear.

To further illustrate the concepts associated with a capsule overview, refer now to the following news article shown in Table 1. (Marking certain phrase units within single quotes is an annotation device, for subsequent references to the text from within this disclosure document; these annotations were not part of the original article.)

TABLE 1

Priest is Charged with Pope Attack

'A Spanish Priest' was charged here today with attempting to murder the Pope. 'Juan Fernandez Krohn', aged 32, was arrested after 'a man armed with a bayonet' approached the Pope while he was saying prayers at Fatima on Wednesday night.
According to the police, 'Fernandez' told the investigators today that 'he' trained for the past six months for the assault. 'He' was alleged to have claimed the Pope "looked furious" on hearing 'the priest's' criticism of his handling of the church's affairs. If found guilty, 'the Spaniard' faces a prison sentence of 15–20 years.

There are a number of reasons why the title, "Priest Is Charged with Pope Attack", is a highly representative abstraction of the content of the passage. It encapsulates the essence of what the story is about: there are two actors, identified by their most prominent characteristics; one of them has been attacked by the other; the perpetrator has been charged; there is an implication of malice to the act. The title brings the complete set of salient facts together, in a thoughtfully composed statement, designed to be brief yet informative. Whether a present day natural language analysis program can derive—without being primed of a domain and genre—the information required to generate such a summary is arguable. (This is assuming, of course, that natural language generation techniques could, in their own right, do,the planning and delivery of such a concise and information-packed message.) However, part of the task of delivering accurate content characterization is being able to identify the components of this abstraction (e.g., 'priest', 'pope attack', 'charged with'). It is from these components that, eventually, a true summary of this document would begin to be constructed.

It is also precisely these components, viewed as phrasal units with certain discourse properties, that a capsule overview should present as a characterization of the context of the document. Accordingly, in the present invention, the most salient and therefore most representative phrasal units, as well as the relational expressions they are associated with, are identified to provide the core content of the document.

Figure 3:
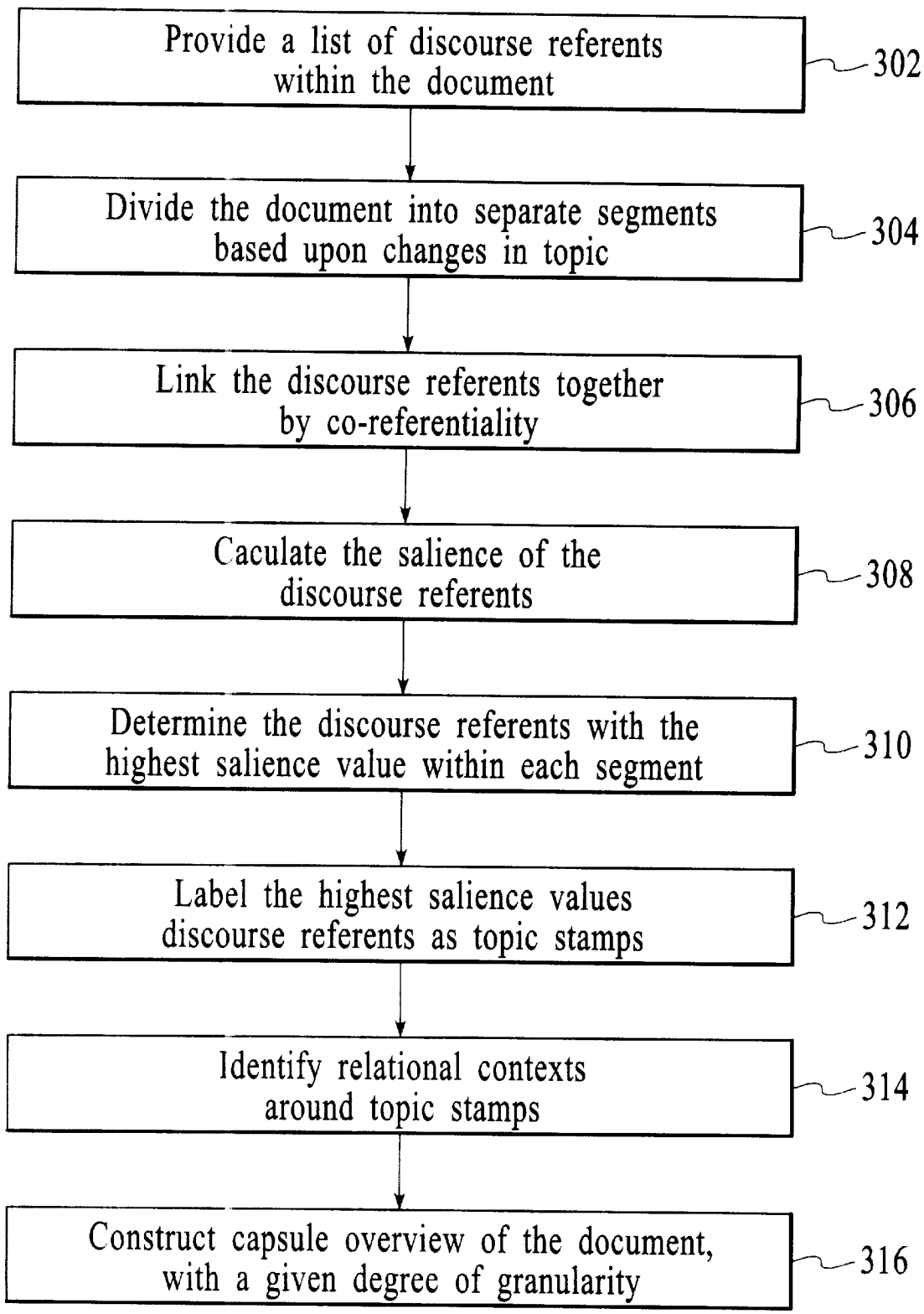
FIG. 3 is a flow chart of a system and method for characterizing the content of a document in accordance with the present invention.

To describe the generation of capsule overviews in accordance with the present invention in more detail refer now to FIG. 3 and the accompanying text. FIG. 3 is a flow chart of a system and method for characterizing the content of a document in accordance with the present invention. As is seen in the figure, first a list of discourse referents are provided within the document via step 302. Then, the document is divided into separate segments based upon changes in topic, via step 304. Thereafter, the discourse referents are linked together into co-reference classes, via step 306. Next, the salience for each of the discourse referents is calculated, via step 308. After those calculations are performed, then it is determined which discourse referents have the highest values within a segment, via step 310.

The core information unit that the invention concerns itself with is the set of discourse referents in a document. Discourse referents are typically realized as noun phrases. In essence, these are the entities—actors and objects—around which a story unfolds. In order to determine, and maintain, an accurate model of what a document is about, it is necessary to be able to identify the ways in which the same entity is referred to in the text, as well as to establish co-referentiality among different 'mentions' in the text of the same entity. The sample document in Table 1 provides examples of the same entity being referred to in different ways in the text ("priest", "a Spanish Priest", "Fernandez", and "he", in the second paragraph, all refer to the same person), as well as of different entities being referred to by the same text string ("he" in the first paragraph refers to the Pope, while "he" in the second paragraph refers to the priest).

Thereafter, discourse referents with the highest salience values are labeled as topic stamps, via step 312. The local contexts around each of the topic stamps are identified, via step 314. Finally, from this information a capsule overview of the document is constructed with a given degree of granularity via step 316. A key concept associated with generation of the capsule overviews is the calculation of salience values for the discourse referents, which are then used for determining topic stamps in the document. The following will discuss salience based calculations in more detail.

2B. Salience-Based Content Characterization

Salience is a measure of the relative prominence of objects in discourse: objects with high salience are the focus of attention; those with low salience are at the periphery. In an effort to resolve the problems facing a term-based approach to content characterization, as discussed in the background of the application, a procedure in accordance with the present invention has been developed which uses a salience feature as the basis for a "ranking by importance" of an unstructured referent set; ultimately, this facilitates topic stamp identification. By determining the salience of the members of a referent set, an ordering can be imposed which, in connection with an appropriate choice of threshold value, permits the reduction of the entire referent set to only those expressions that identify the most prominent participants in the discourse. This reduced set of terms, in combination with information about local context at various levels of granularity (verb phrase, minimal clause, sentence, etc.) offers an accurate and detailed characterization of a document's content. This may then be folded into an appropriate presentation metaphor such as that will be described hereinafter. Crucially, such an analysis satisfies some important requirements of usability of document content abstractions: it is concise, it is coherent, and it does not introduce cognitive overload. In a more general sense, this method utilizes a strategy for scaling up the phrasal analysis techniques utilized by standard term identification and template instantiation technologies, which has at its core the utilization of a crucial feature of discourse structure: the prominence, over some segment of text, of particular referents—something that is missing from the traditional technology for 'bare' terminology identification.

2C. Anaphora Resolution and Local Salience

For the purposes of determining how discourse referents relate to objects in the world of the document, a simplifying assumption is made that every noun phrase identified by extended phrasal analysis constitutes a "mention" of a participant in the discourse. In order to determine which expressions constitute mentions of the same referent, the method described here crucially relies upon being able to carry out anaphora resolution and co-referent identification. Linguistic expressions that are identified as coreferential are grouped into equivalence classes, and each equivalence class is taken to represent a unique referent in the discourse. The set of such equivalence classes constitutes the full referent set from which, ultimately, topic stamps will be derived.

A distinctive feature of the anaphora resolution algorithm is that it has been specially adapted to work from a shallow syntactic base: specifically, it does not require full syntactic analysis of the text. This makes the method applicable to any text document, irrespective of its domain, style, or genre. This type of anaphora resolution algorithm is described, in full detail, in the paper "Anaphora for Everyone: Pronominal Anaphora Resolution Without a Parser," by C. Kennedy and B. Boguraev, which was presented at the 16*th International Conference on Computational Linguistics,* Copenhagen, Denmark, Aug. 5–9, 1996.

The immediate result of anaphora resolution is to reduce the extended phrase set of all mentions of objects in the discourse; the larger consequence is that it provides the basis for the identification of topic stamps, as it introduces both a working definition of salience and a formal mechanism for determining the salience of particular linguistic expressions. This connection between anaphora resolution, co-reference identification, discourse salience, and semantic prominence is described in fuller detail in "Anaphora for Everyone: Pronominal Anaphora Resolution Without a Parser," (C. Kennedy and B. Boguraev, in *Proceedings of COLING-96* (16*th International Conference on Computational Linguistics*), Copenhagen, DK, Aug. 5–9, 1996) and "Anaphora in a Wider Context: Tracking Discourse Referents" (C. Kennedy and B. Boguraev, in W. Wahlster, Editor, *Proceedings of ECAI-96* (12*th European Conference on Artificial Intelligence*), Budapest, Hungary, Aug. 11–16, 1996. John Wiley and Sons, Ltd., London/New York).

Roughly speaking, the anaphora resolution procedure locates an antecedent for an anaphoric expression by first eliminating all impossible candidate antecedents, then ranking the remaining candidates according to a salience measure and selecting the most salient candidate as the antecedent. This measure, which is referred to as 'local salience', is a function of how a candidate antecedent expression satisfies a set of grammatical, syntactic, and contextual parameters. These constraints are typically referred to as "salience factors". Individual salience factors are associated with numerical values, as shown below.

TABLE 2

| | |
|---|---|
| "sent": | 100 iff the expression is in the current sentence. |
| "cntx": | 50 iff the expression is in the current discourse segment. |
| "subj": | 80 iff the expression is a subject |
| "exst": | 70 iff the expression is in an existential construction. |
| "poss": | 65 iff the expression is a possessive. |
| "acc": | 50 iff the expression is a direct object. |
| "dat": | 40 iff the expression is an indirect object. |
| "oblq": | 30 iff the expression is the complement of a preposition. |
| "head": | 80 iff the expression is not contained in another phrase. |
| "arg": | 50 iff the expression is not contained in an adjunct. |

The local salience of a candidate is the sum of the values of the salience factors that are satisfied by some member of the equivalence class to which the candidate belongs; values may be satisfied at most once by each member of the class. The most important aspect of these numerical values for our concerns is that they impose a relational structure on the salience factors, which in turn provides the basis for ordering referents according to their relative prominence in the discourse (in other words, what is important is not so much the values themselves but the fact that they denote that, for instance, "subj" factor indicates higher prominence than "ac", itself more prominent than "oblq", and so forth).

2D. Discourse Salience and Capsule Overviews

An important feature of local salience is that it is variable: the salience of a referent decreases and increases according to the frequency with which it is mentioned (taking into account subsequent anaphoric expressions). When an anaphoric link is established, the anaphor is added to the equivalence class to which its antecedent belongs, and the salience of the class is boosted accordingly. If a referent ceases to be mentioned in the text, however, its local salience is incrementally decreased; this reflects decay in its prominence. This approach works well for the purpose of anaphora resolution, because it provides a realistic representation of the antecedent space for an anaphor by ensuring that only those referents that have mentions within a local domain have increased prominence. However, the ultimate goal of salience-based content characterization differs from that of anaphora resolution in an important respect. In order to determine which linguistic expressions should be presented as broadly representative of the content of a document, it is necessary to generate a picture of the prominence of referents across the entire discourse, not just within a local domain.

For illustration of the intuition underlying this idea, consider the news article discussed in Table 1. Intuitively, the reason why "priest" is at the focus of the title is that there are no less than eight references to the same actor in the body of the story (marked by single quotes in the example); moreover, these references occur in prominent syntactic positions: five are subjects of main clauses, two are subjects of embedded clauses, and one is a possessive. (This example also illustrates the rationale behind the above-described salience factors.) Similarly, the reason why "Pope attack" is the secondary object of the title is that a constituent of the compound, "pope", also receives multiple mentions (five), although these references tend to occur in less prominent positions (two are direct objects).

In order to generate the broader picture of discourse structure needed to inform the selection of certain expressions as most salient, and therefore most representative of content, an elaboration is introduced of the local salience computation described above that uses the same conditions to calculate a non-decreasing, global salience value for every referent in the text. This non-decreasing salience measure, which is referred to as 'discourse salience', reflects the distributional properties of a referent as the text story unfolds. In conjunction with the "tracking" of referents made available by anaphora resolution—as discussed at some length in "Anaphora in a wider context: Tracking discourse referents" (C. Kennedy and B. Boguraev, in W. Wahlster, editor, *Proceedings of ECAI-96* (12*th European Conference on Artificial Intelligence*), Budapest, Hungary, Aug. 11–16, 1996. John Wiley and Sons, Ltd, London/New York)—discourse salience provides the basis for a coherent representation of discourse structure that indicates the topical prominence of individual mentions of referents in isolated segments of text.

Most importantly, discourse salience provides exactly the information that is needed to impose the type of importance-based ranking of referents which is required for the identification of topic stamps. Specifically, by associating every referent with a discourse salience value, the topic stamps can be identified for a segment of text S as the n highest ranked referents in S, where n is a scalable value.

The notion "segment of text" plays an extremely important role in the content characterization task, as it provides the basic information-structuring units around which a capsule overview for a document is constructed. Again, the example from Table 1 gives a useful illustration of the important issues. The reason that the title of this passage works as an overview of its content is because the text itself is fairly short. As a text increases in length, the "completeness" of a short description as a characterization of content deteriorates. If the intention is to use concise descriptions consisting of one or two salient phrases—i.e., topic stamps—along with information about the local context in which they appear as the primary information-bearing units for a capsule overview, then it follows that texts longer than a few paragraphs must be broken down into smaller units or "segments".

In order to solve this problem, a document is recast as a set of "discourse segments", which correspond to topically coherent, contiguous sections of text. One approach to segmentation which works well for the purposes of this method implements a similarity-based algorithm along the lines of that described by Hearst, in her paper entitled "Multi-Paragraph Segmentation of Expository Text." (M. Hearst, in 32*nd Annual Meeting of the Association for Computational Linguistics,* Las Cruces, N.M., 1994), which identifies discourse segments in text using a lexical similarity measure. By calculating the discourse salience of referents with respect to the results of discourse segmentation, each segment can be associated with a listing of those expressions that are most salient within the segment, i.e., each segment can be assigned a set of topic stamps. The result of these calculations, namely the set of segment-topic stamp pairs, ordered according to linear sequencing of the segments in the text, can then be returned as the capsule overview for the entire document. In this way, the problem of content characterization of a large text is reduced to the problem of finding topic stamps for each discourse segment.

3. Capsule Overviews as Document Abstractions

Striving to balance the conflicting requirements of depth and accuracy of a summary with those of domain- and genre-independence, the notion of a capsule overviews has been developed as content abstraction for text documents, explicitly designed to capture "aboutness". One of the problems of information management, when presented with a growing surplus of text documents, is getting some appreciation—rapidly, compactly, and yet with a usable degree of depth and representativeness—of the information contained in a document. Informally, this is usually referred to as the "aboutness" of a document, and is represented as a set of highly salient, and by that token most representative, phrases in the document. By viewing topicality in its stricter, linguistic, sense, the previous section defined topic stamps to be the most prominent of these phrases, introduced into, and then elaborated upon, the document body. On the basis of this definition, the above-identified computational, algorithmic, procedure has been developed for generating a set of abstractions for the core meaning in the document, ultimately resulting in a capsule overview of the document based upon suitable presentation of the most representative, and most contentful, expressions in the text. These abstractions comprise layered and inter-related phrasal units at different levels of granularity and depth of document analysis. To further describe this concept of granularity refer now to the following discussion.

Granularity is closely tied to context. In general, the information in a given sentence is best expanded by being able to position this sentence in its paragraph context; likewise, the theme and topic(s) in a paragraph can be further elaborated by relating the paragraph to the segment of discourse which encompasses the theme in its entirety. This is a natural containment hierarchy, relating the different information levels in a document together. Such a hierarchy can also be extended in sub-sentential direction: phrasal units indicative of topicality are clearly wholly contained in sentences; furthermore, a phrasal containment hierarchy could also be utilized to provide contextualized information concerning the topical phrases themselves.

Imagine that in the second example above (Example 2, page 5) some mechanism has determined that the phrase "Scheduled IRS Layoffs" is topically indicative. Assuming some focused mining in the vicinity of such an 'anchor' by a phrasal grammar of a certain type, this topic phrase could be further contextualized to "Scheduled IRS Layoffs For 500 Are Canceled". This is an example of phrasal containment of information-bearing phrasal units. Similar expansion of topic in context might yield, for the initial discourse segment of the document, progressively larger and more informative fragments from it:

EXAMPLE 4

This example illustrates the notion of granularity of document analysis, and is especially indicative of how a containment hierarchy of layered information—from very compact and representative topical phrases all the way to full and rich discourse segments—can be utilized to represent and maintain strong notion of contextualization in a document abstraction.

The example also shows the value of being able to identify phrasal units smaller than sentences, arrange them in layers corresponding to the informational containment hierarchy, and perform certain semantic operations over them. These operations fall largely in the area of reference identification, co-referentiality, and topic tracking; consider, for example, the processes of relating "layoffs" to "scheduled IRS layoffs", identifying "Internal Revenue Service" and "IRS" as referring to the same object, resolving anaphora in general and so forth.

4. Filling in the Gaps: User Involvement

It is clear that granularity of analysis and containment hierarchy of information-bearing phrasal units with different (yet complementary) discourse properties and function could be utilized very effectively to implement a "zooming" function into and/or out of a given document. In this way finding out more of what is behind a document "summary" is, in effect, filling in the gaps in such a summary in a controlled fashion, guided by incrementally revealing progressively larger and more informative contexts.

Conceptually, this is not dissimilar to the notion of "percentage of shrink factor", typically utilized by sentence-based summarizes, where a user can specify that a document should be condensed to N percent of its full extent. There is, however, a crucial difference here. When re-casting a document from, say, 10% to 20% shrink factor, there is no way to specify ahead of time, nor to know after the event, how the additional sentences relate to the original 10%. In contrast, when a document is re-cast in terms of information-bearing units a level higher than what its current representation uses—for instance, as a set of relational contexts immediately surrounding its topic stamps—there is a guarantee that the user's sense of what the document is about is incrementally and monotonically enriched.

This makes it possible to use the capsule overview technology in accordance with the present invention to enable a user to get an immediate and accurate impression of what a particular document is about. As a capsule overview is a small window into the core content of a document, it is a useful abstraction for compact representa- TOPICAL PHRASE: "Scheduled IRS Layoffs"
TOPIC IN RELATIONAL CONTEXT: "there will be no layoffs"
TOPICAL SENTENCE: "Yesterday, the IRS said therewillbenolayoffs"
SENTENCE IN PARAGRAPH CONTEXT:
"More than a year ago,
The Internal Revenue Service planned widespread job cuts.
Yesterday,theIRSsaidtherewillbenolayoffs."
PARAGRAPH WITHIN TOPICALLY COHERENT DISCOURSE THEME:
"More than a year ago,
theInternalRevenueServiceplannedwidespreadjobcuts.
Yesterday,theIRSsaidtherewillbenolayofs."
Confronted with congressional criticism and calls for reform
in light of some highly pubilcized reports of abusive actions
toward taxpayers, as well as staunch union opposition to the cuts,
the IRS said employees at risk of losing their jobs
would be reassigned to improve 'customer service,'
help taxpayers resolve problems and
increase compliance with tax laws."

tion of content. Once engaged, however, the user can still use this window to 'drill', arbitrarily deeply, into the underlying information layers. Before discussing the approach to visualization of document content and presentation metaphors for using capsule overviews as mediators, and facilitators, of dynamic document content delivery, the basic notions of topically rich capsule overviews as layered abstractions of document content are exemplified hereinbelow.

5. Document Characterization by Topics

5A Capsule Overview Example

The following discussion describes an example of an article the analysis of which utilizes the present invention. As described in sections 2 and 3 above, the operational components of salience-based content characterization fall in the following categories: discourse segmentation; phrasal analysis (of nominal expressions and their relational contexts); anaphora resolution and generation of a referent set; calculation of discourse salience and identification of topic stamps; and enriching topic stamps with information about relational context(s). Some of the functionality follows directly from technology developed for the purposes of phrasal identification, suitably augmented with mechanisms for maintaining phrase containment; in particular, both relation identification and extended phrasal analysis are carried out by running a phrasal grammar over a stream of text tokens tagged for lexical, morphological, and syntactic information, and for grammatical function; this is in addition to a grammar mining for terms and, generally, referents.

In a preferred embodiment the base level linguistic analysis is provided by the LINGSOFT supertagger; see F. Karlsson, A. Voutilainen, J. Heikkila, and A. Antilla, "*Constraint Grammar: A Language-Independent System for Parsing Free Text*", Mouton de Gruyter, 1995. The later, more semantically-intensive algorithms are described in detail in "Anaphora for Everyone: Pronominal Anaphora Resolution Without a Parser" (C. Kennedy and B. Boguraev, in *Proceedings of COLING-96* (16*th International Conference on Computational Linguistics*), Copenhagen, DK, 1996) and "Anaphora in a Wider Context: Tracking Discourse Referents" (C. Kennedy and B. Boguraev, in W. Wahlster, editor, *Proceedings of ECAI-96* (12*th European Conference on Artificial Intelligence*), Budapest, Hungary, 1996. John Wiley and Sons, Ltd, London/New York). The procedure is illustrated by highlighting certain aspects of a capsule overview of an article 400 shown in FIG. 4. The document is of medium-to-large size (approximately four pages in print), and focuses on the strategy of Gilbert Amelio (former CEO of Apple Computer) concerning a new operating system for the Macintosh. Too long to quote here in full, the following passage from the beginning of the article contains the first, second and third segments (shown at 402, 404, and 406 in FIG. 4), as identified by the discourse segmentation component. (In the figure, segment boundaries are marked by extra vertical space; this markup is for illustration purposes only, and indicates the result of running the discourse segmentation algorithm. No such demarcation exists in the source of the article itself).

The capsule overview was automatically generated by a fully implemented, and operational, system, which incorporates all of the processing components identified above. The relevant sections of the overview of the article 400 (for the three segments of the passage quoted) are shown in Tables 3, 4 and 5 below.

The topic stamps for the three segments 402, 404, and 406 constitute the core data out of which a capsule overview is constructed; these are shown underlined immediately following the segment sequence identifiers (in square brackets). The capsule overview itself displays the topic stamps (highlighted in single quotes) in their relational contents.

TABLE 3

[1] Apple; Microsoft

'Apple' would swoop in and take 'Microsoft's' customers?
'Apple' lost $816 million;
'Microsoft' made $2.2 billion.
'Microsoft' has a market value thirty times that of 'Apple'
it makes sense for 'Apple'
'Apple' is in a position
'Apple' needs something dramatic

TABLE 4

[2] desktop machines; operating system

Today's 'desktop machines', he [Gilbert Amelio] says
Tomorrow's 'machines' must accommodate rivers of data
Time to scrap your 'operating system' and start over
The 'operating system' is the software that controls
to go with the 'reengineered operating system'

TABLE 5

[3] Gilbert Amelio; new operating system

'Amelio', 53, brings a lot of credibility to this task
'His' [Gilbert Amelio] resume includes
where is 'Amelio' going to get this 'new operating system'?
radical redesign in 'operating systems' that 'Amelio' is talking about The division of this passage into segments, and the segment-based assignment of topic stamps, exemplifies a capsule overview's "tracking" of the underlying coherence of a story. The discourse segmentation component recognizes shifts in topic—in this example, the shift from discussing the relation between Apple and Microsoft to some remarks on the future of desktop computing to a summary of Amelio's background and plans for Apple's operating system. Layered on top of segmentation are the topic stamps themselves, in their relational contexts, at a phrasal level of granularity.

The first segment (Table 3) sets up the discussion by positioning Apple opposite Microsoft in the marketplace and focusing on their major products, the operating systems. The topic stamps identified for this segment, "apple" and "microsoft", together with their local contexts, are both indicative of the introductory character of the opening paragraphs and highly representative of the gist of the first segment. Note that the apparent uninformativeness of some relational contexts, for example, ". . . 'Apple' is in a position . . . ", does not pose a serious problem. An adjustment of the granularity—at capsule overview presentation time (see below)—reveals the larger context in which the topic stamp occurs (e.g., a sentence), which in turn inherits the high topicality ranking of its anchor: "Apple' is in a position where standing pat almost certainly means slow death."

For the second segment (Table 4) of the sample, "operating system" and "desk-top machines" have been identified as representative. The set of topic stamps and contexts illustrated provides an encapsulated snapshot of the segment, which introduces Amelio's views on coming challenges for desktop machines and the general concept of an operating system. Again, even if some of these are some-what under-specified, more detail is easily available by a change in granularity, which reveals the definitional nature of the even larger context "The 'operating system' is the software that controls how your computer's parts . . . "

The third segment (Table 5) of the passage exemplified above is associated with the stamps "Gilbert Amelio" and "new operating system". The reasons, and linguistic rationale, for the selection of these particular noun phrases as topical are essentially identical to the intuition behind "priest" and "Pope attack" being the central topics of the example in Table 1. The computational justification for the choices lies in the extremely high values of salience, resulting from taking into account a number of factors: co-referentiality between "amelio" and "Gilbert Amelio", co-referentiality between "amelio" and "his", syntactic prominence of "amelio" (as a subject) promoting topical status higher than for instance "Apple" (which appears in adjunct positions), high overall frequency (four, counting the anaphor, as opposed to three for "Apple"—even if the two get the same number of text occurrences in the segment), and boost in global salience measures, due to "priming" effects of both referents for "Gilbert Amelio" and "operating system" in the prior discourse of the two preceding segments. Compared to a single phrase summary in the form of, say, "Amelio seeks a new operating system", the overview for the closing segment comes close; arguably, it is even better than any single phrase summary.

As the discussion of this example illustrates, a capsule overview is derived by a process which facilitates partial understanding of the text by the user. The final set of topic stamps is designed to be representative of the core of the document content. It is compact, as it is a significantly cut-down version of the full list of identified terms. It is highly informative, as the terms included in it are the most prominent ones in the document. It is representative of the whole document, as a separate topic tracking module effectively maintains a record of where and how referents occur in the entire span of the text. As the topics are, by definition, the primary content-bearing entities in a document, they offer accurate approximation of what that document is about.

6. Temporal Typography for Dynamic Document Delivery

Dynamic content delivery is based on ideas of temporal typography developed by Wong (Y. Y. Wong, *Temporal typography, characterization of time-varying typographic forms*, Master's thesis, MIT Media Lab, 1995). This work develops a synergy of psychological studies of reading, graphic design, and temporal presentation of text. Graphic design history is rich with examples of experimenting with visual treatment of written language. Designers have begun to explore temporal presentation of text in television and film media. Studies of reading, which to a large extent form the basis of Wong's work, have explored dynamic presentation of content, related to the interactions between meaning and intent of a text-based message. However, Wong's studies of the dynamic relationship between meaning and delivery formats assume that the annotations for meaning in her experiments have been done by hand. In contrast, this invention is concerned with leveraging an automatic document content analysis technology, capable of delivering meaning analyses and content abstractions precisely of the kind which can be effectively coupled with dynamic content delivery.

7. Visualization of Document Content

Previously, the predominant current mechanism for mediating the spectrum between a summary of a document and a complete version of the same document was briefly discussed. In addition to a direct hypertext rendering of extracted sentences, in their full document s contexts, two variations on this approach are the VESPA slider and HYPERGEN. VESPA is an experimental interface to Apple's sentence-based summarizer (Advanced Technologies Group, Apple Computer, Cupertino, Calif., Apple Information Access Toolkit: *Developer Notes and APIs*, 1997), whose main feature is a slider which dynamically readjusts the shrink factor of a document summary. HYPERGEN exploits notions of phrasal containment within sentence units, in an attempt to elaborate a notion similar to that of granularity of analysis and context introduced earlier in this document: in a process called sentence simplification, Mahesh (K. Mahesh, Hypertext summary extraction for fast document browsing, in *Proceedings of AAAI Spring Symposium on Natural Language Processing for the World Wide Web*, ages 95–104, Stanford, Calif., 19975) uses phrases as "sentence surrogates", which are then straightforwardly rendered as hypertext links to the sentences themselves.

As part of an ongoing investigation of visualizing large information spaces, researchers at Xerox PARC have looked at a variety of structured data types (such as hierarchically structured data, calendars, and bibliographic databases). Some general principles derived from that work have been applied to unstructured documents: the DOCUMENT LENS is a technique for viewing 2-D information, designed for component presentations of multi-page documents. Without going into detail, what is of particular relevance here is the strong notion of focus plus context which drives the design. The visualization, however, does little in terms of using any kind of document summary or other abstraction, and is of a predominantly static nature (even though it is extremely responsive to user interaction, as it attempts to combine a 'bird's eye view' of the entire document with a page browsing metaphor). More recently experimental prototypes have been developed for interfaces which treat term sets (in the information retrieval sense, i.e. flat lists of index terms) as document surrogates: the focus of such designs is visually on presenting notions like distribution of terms across the document, and on mediating access to local context for a given term (R. Rao, J. O. Pedersen, M. A. Hearst, J. D. Macinlay, S. K. Card, L. Masinter, P.-K. Halvorsen, and G. G. Robertson, "Rich interaction in the digital library", *Communication of the ACM*, 38(4):29–39, 1995; M. A. Hearst, "Tilebars: Visualization of term distribution information in full text information access," in *ACM SIGCHI Conference on Human Factors in Computing Systems*, Denver, Colo., 1995). Ultimately, however, these interfaces still offer only a direct link between two states, the document surrogate and its full form.

With the migration of news delivery over the World Wide Web and the growth of information 'push' vendors, some new methods are beginning to emerge for presentation of news stories which use notions of dynamic delivery of content. Most of these are variations on the same theme: news delivery using a ticker metaphor. Thus both ABC's news site (http://www.abc.com) and Pointcast (http://www.pointcast.com) employ a traditional horizontal ticker, CNN Interactive (http://www.cnn.com) arrange their ticker vertically, while CBS (http://www.uttm.com) combine a ticker with photos from a major story.

The important insight here is that tickers are dynamic objects, which can be programmed to continuously update themselves from a news feed and to cycle in a pre-defined regime, therefore not requiring user intervention. Furthermore, they can be dispatched to an area of the workspace (monitor screen) where constant, yet inobtrusive, news delivery can take place in the periphery of the user's main activity: thus a choice exists between proactive engagement with the news source, and passive (and almost subliminal) monitoring of news data.

None of the examples above, however, combines a ticker with an automatic summarization engine. To a large extent this is because sentences—especially inconsecutive ones, in the absence of visual markers for discontinuity—do not lend themselves easily into the word by word, left to right, presentation mode. This is clearly a situation where phrasal units of a sub-sentence granularity can be utilized much more effectively. In addition, psychological experiments on active reading (Y. Y. Wong, *Temporal typography, characterization of time-varying typographic forms,* Master's thesis, MIT Media Lab, 1995) show that when text is presented dynamically in the manner of a ticker, subjects' reading speeds are significantly slower than for text presented statistically. On the other hand, dynamic presentations of text which show words or short phrases in the same location, but serially, one after the other, have reading speeds comparable to those for normal static texts.

To date, no applications have been developed utilizing temporal typography for dynamic delivery of content abstractions. Wong has looked at how dynamic type in general can be used for four different communicative goals: expressive messages, dialogue, active reading and real time conversation Most relevant to this discussion are her experiments on active reading. In one of these she used a basic RSVP (Rapid Serial Visual Presentation) method (words or phrases presented sequentially one after another, on the same line and at the same position) to deliver a sequence of news headlines. In a second set of experiments called HIGHWAY NEWS, three dimensions are utilized, combined with a zooming motion, to present a sequence of text highlights. "News headlines are placed one after another in the z-dimension. Headlines are presented serially according to active input from the reader presses a mouse button to fly through the rows of headlines—as if flying over highway of text." These experiments show the strong feasibility of high impact, low engagement, delivery of semantically prominent text fragments being utilized as a powerful technique for visualizing certain types of inherently linear information.

None of the work cited above relies on automatically generated meaning abstractions as its input; yet, it is clear that the topically-rich capsule overviews generated by the document analysis technology discussed in sections 2 and 3, and exemplified in section 5, are just the kind of semantic highlights which Wong's experiments in active reading assume. Conversely, up till now there has been no thought as to how the nature of topic-based capsule overviews in particular would fit the notion of dynamic type. This is a key feature of the present invention, and is discussed below.

8. Dynamic Document Viewer

Below will be described three embodiments of systems or viewers for providing dynamic presentation of documents. These three embodiments will be hereinafter referred to as the TopicsTicker Viewer, Rapid Serial Visual Presentation (RSVP) Viewer and the ViewTool Viewer. It should be understood that although these three viewers are described, one of ordinary skill in the are recognizes a variety of views could be utilized and they would be within the spirit and scope of the present invention. To more particularly describe these embodiments refer now to the following discussion in conjunction with the accompanying Figures.

The above three embodiments provide different dynamic views of document content. The difference is largely due to the variety of operational environments in which the viewers have been applied. A variation on a news ticker is designed to be deployed in situations where screen real estate may be at premium, or where several different channels of information may be delivered simultaneously to the same 'in-box'; typically such situations assume that users would only want to get a very general idea of document content. For situations where more screen real estate might be available, and/or it may be known ahead of time that more detail concerning document content might be required, a different viewer develops ideas from rapid serial visual presentation (RSVP). Yet another interface caters to the need to be able to get immediate access to the full text of a document, without losing the benefits of rapid skimming through content highlights while filly maintaining information about the larger context.

All of the viewers assume an environment where incoming documents get analyzed to capsule overview level (See FIG. 3); the results of the analysis are embedded into the original text by means of, for example, special purpose tags.

8A. TopicsTicker Viewer

Figure 5:
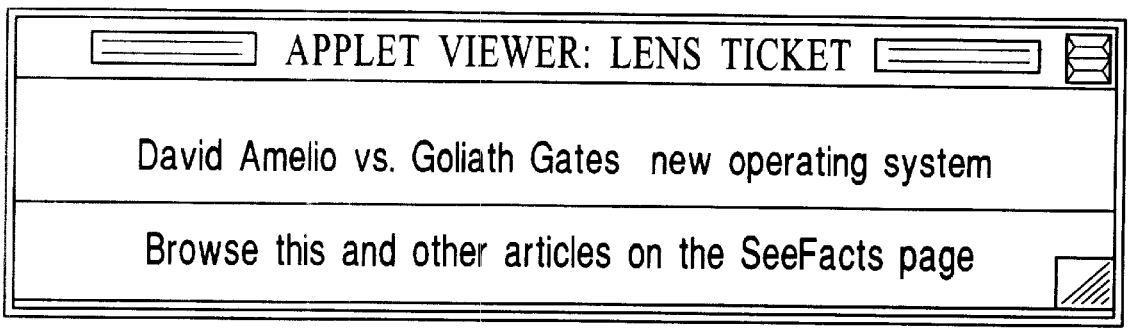
FIG. 5 is a depiction of a TopicsTicker in accordance with the present invention.

TopicsTicker Viewer as shown in FIG. 5 is a minimalist, hands-free, peripheral-vision-directed ticker tape, with certain aspects of its display tuned for serial delivery of a document's topic stamps: the string in the left panel is the document title, and the right panel is where the display cycles, continuously, through the document's topic stamps. When running over a set of documents, switching from one document to the next is cued by a color change and a vertical scroll.

8B. Rapid Serial Visual Presentation (RSVP) Viewer

Figure 6A:
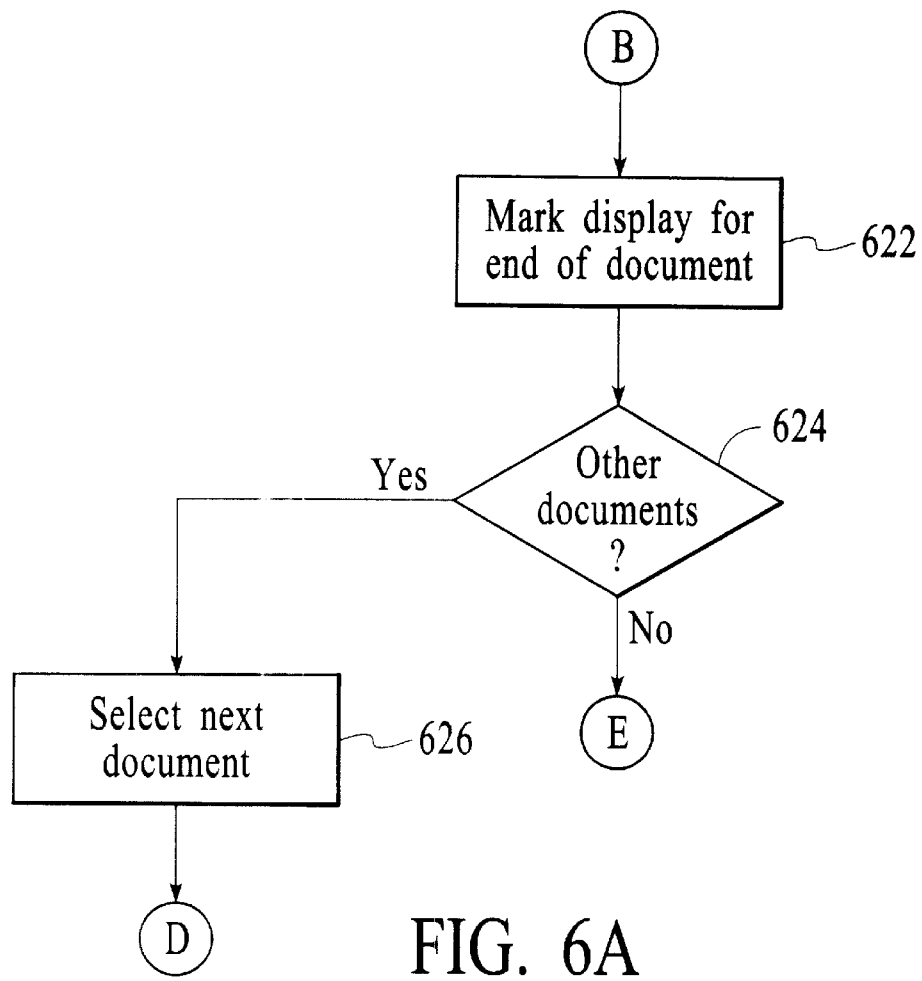
FIG. 6 is a flow chart of the basic operation of a RSVP viewer in accordance with the present invention.
Figure 6B:
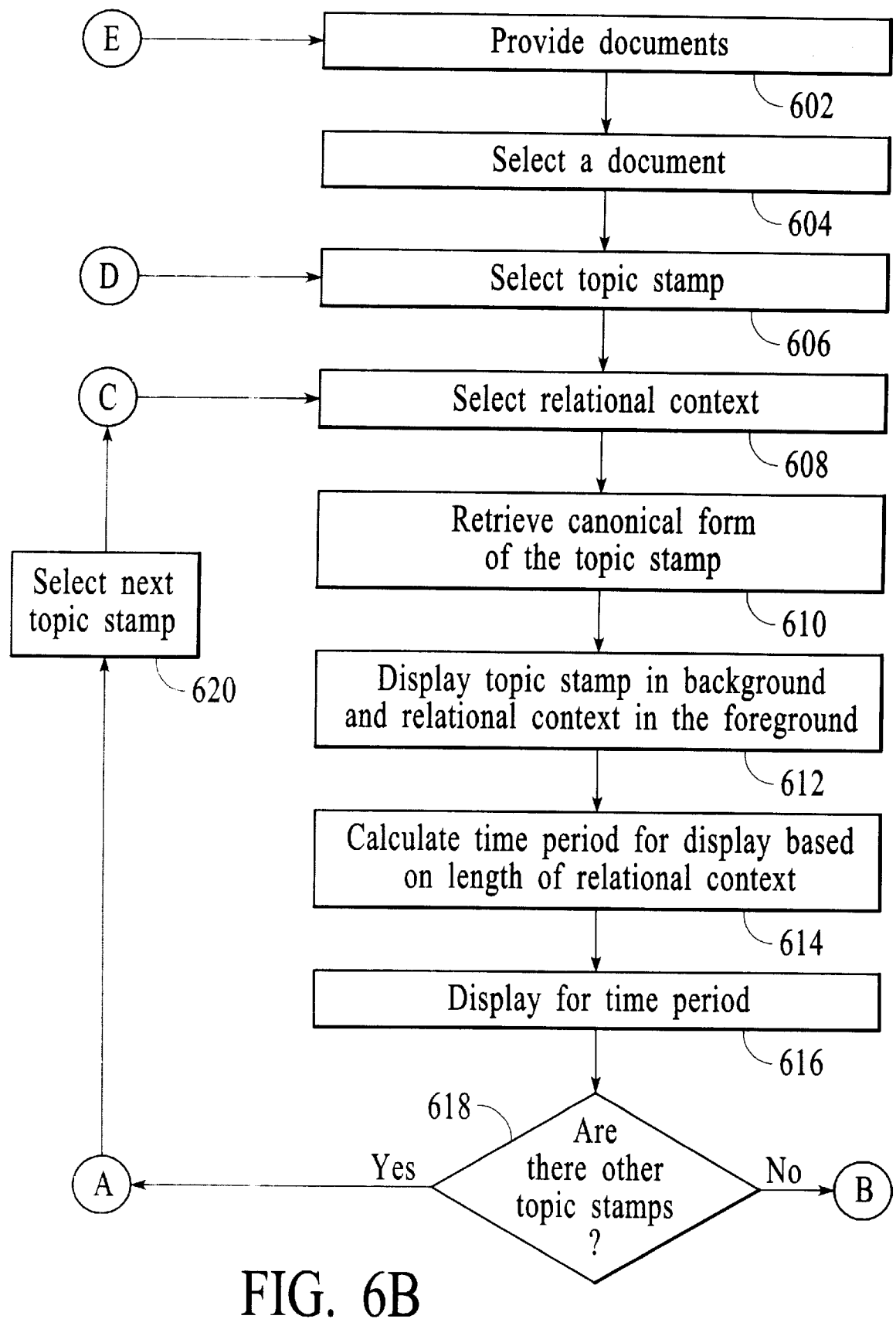

FIG. 6 is a flow chart of the operation of the RSVP viewer. First, a list or plurality of consecutively ordered documents are provided, via step 602. Next, the first document in order is selected, via step 604. Thereafter, the first topic stamp from the current document is selected from the capsule overview, via step 606: The relational context for that topic stamp is selected from the capsule overview, via step 608. The canonical form for that topic stamp is retrieved, via step 610. Then the topic stamp is displayed in the background, in translucent type, and its associated relational context is displayed in the foreground, in heavier type, via step 612. Next, a time period for displaying the relational context is calculated, via step 614. This time period is based upon the amount of information displayed. The topic stamp and relational context are then displayed for that time period, via step 616. It is then determined if there are other topic stamps, via step 618. If there are other topic stamps, then the next topic stamp is selected, via step 620 and its associated relational context is selected, via step 608, and the cycle is repeated. If on the other hand, there are no other topic stamps, a visual worker is displayed, indicating a document change, via step 622. It is then determined if there are other documents, via step 624. If there are no other documents then recycle back from the first document. If there are other documents, then the next document in consecutive order is selected, via step 626. Thereafter, its first topic stamp is selected, via step 606, and the cycle is repeated.

This continuous cycle defines the basic mode of operation for RSVP viewer. It can, as will be discussed below, be interrupted by the user at any time.

Figure 7A:
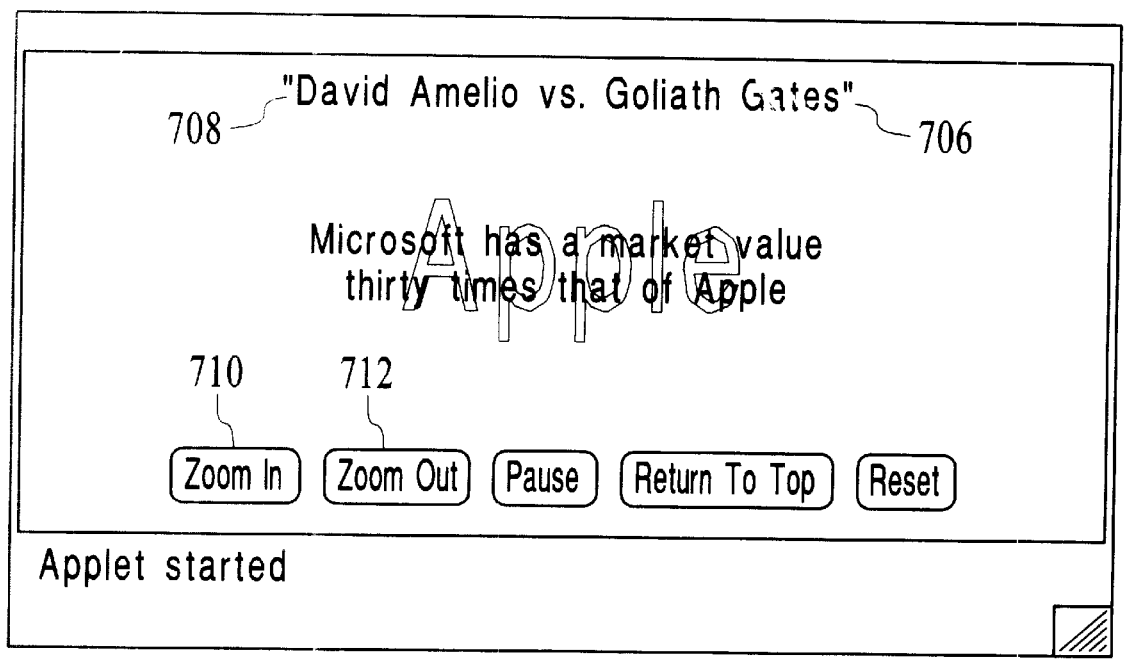
FIGS. 7A–7F are depictions of a RAPID SERIAL VISUALIZATION PRESENTATION (RSVP) viewer in accordance with the present invention.
Figure 7B:
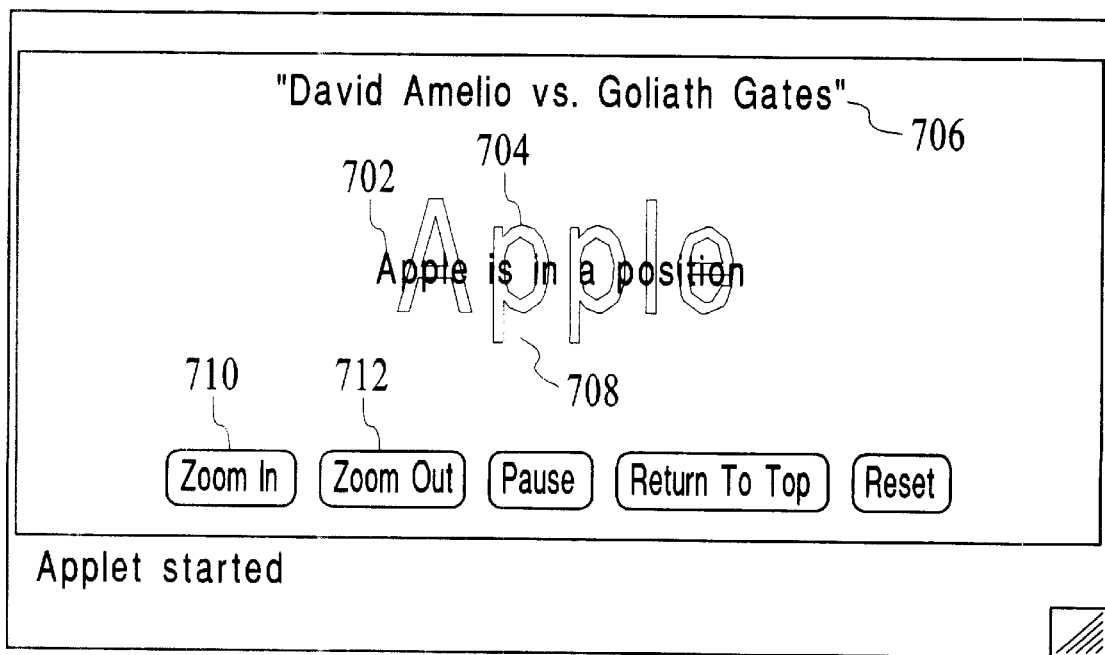
Figure 7C:
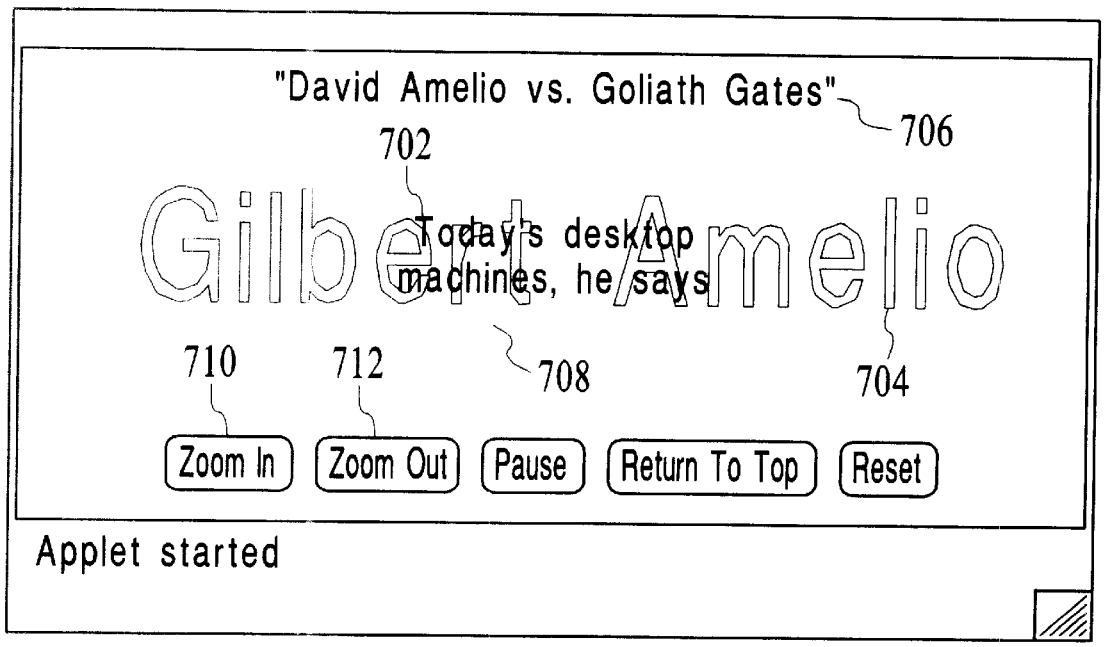

In its basic mode with no user interaction, the RSVP Viewer cycles through all salient relational contexts in a document, maintaining the order in which they appear in the text. As shown in FIGS. 7A–7B, each context phrase is displayed as the prominent object on the screen 702; at the same time the context is overlaid onto topic expansions (displayed as translucent text) 704. This facilitates further interpretations of the context strings by the user: expansions relate phrasal contractions in the string displayed to their full canonical forms in the text, make clear antecedents of dangling anaphors, and so forth. Note, for instance, the background display (FIG. 7C) 704 of the full form of the antecedent for the anaphoric "he" in the foreground 702: in this particular context, "he" has been resolved to "Gilbert Armelio".

Cycling though the complete set of salient contexts, in their original sequence, offers a good indication of aboutness at a given level of depth and detail. Granularity of display is adjustable via a parameter: thus RSVP Viewer could be reduced to a TopicsTicker Viewer by only cycling through the document's topic stamps, or it could be used to display sequences of sentences. Relational contexts offer just the right balance between terseness (phrases are more easily perceived and assimilated than sentences) and informativeness (phrases larger than 'bare' topic stamps convey richer data). The amount of time a phrase is displayed is dynamically calculated, based on studies of active reading and perception; the intent is to optimize the full document display regime so that individually, each phrase can be processed by the user, while globally, the entire set of salient contexts can be cycled through rapidly.

There are provisions for maintaining overall context, by continuously displaying the title of the current document 706, as well as for allowing context switching, by user selection of a document from a pop-up menu 708 (co-located with the title), via for example by a mouse click.

RSVP Viewer is designed as an entirely autonomous viewer: after all the content highlights in a document have been displayed, the next document will be loaded and the cycle repeated (just like in TopicsTicker Viewer, a suitable visual cue signals document change). This makes it very appropriate for situations where readers do not have much time, bandwidth, or opportunity, to interact with the display, but they would want to be peripherally aware of new documents that come into the system. On the other hand, if a particular context catches the user attention, a 'zoom' mechanism makes use of the multiple levels of analysis of the document (as defined via the containment hierarchy discussed in Section 3, "Capsule Overviews as Document Abstractions").

Figure 7D:
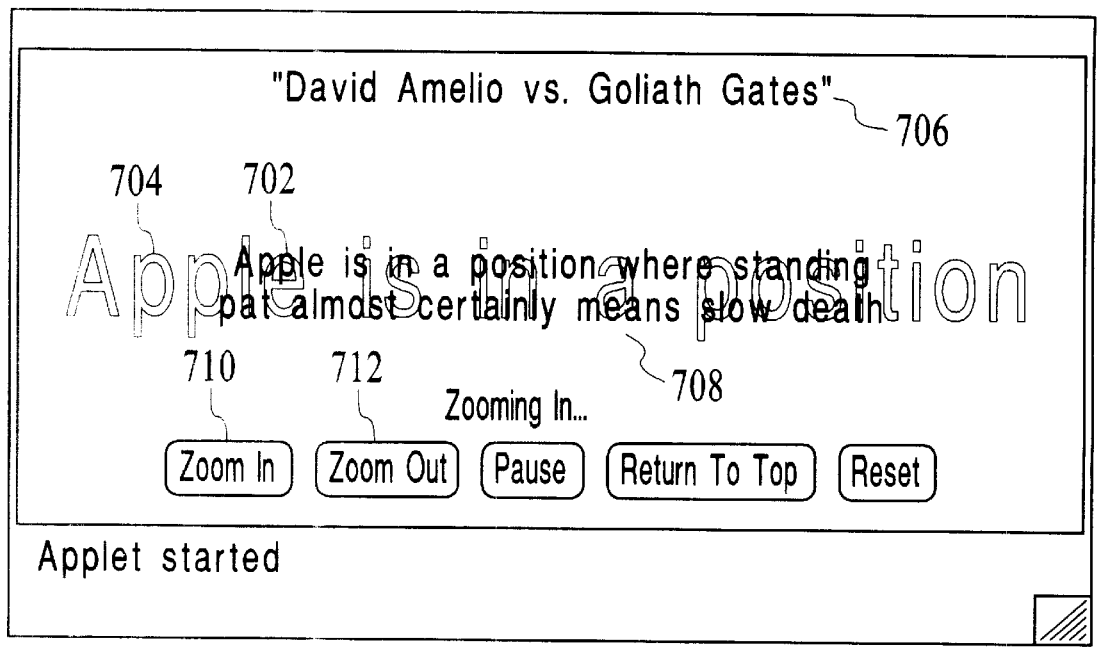
Figure 7E:
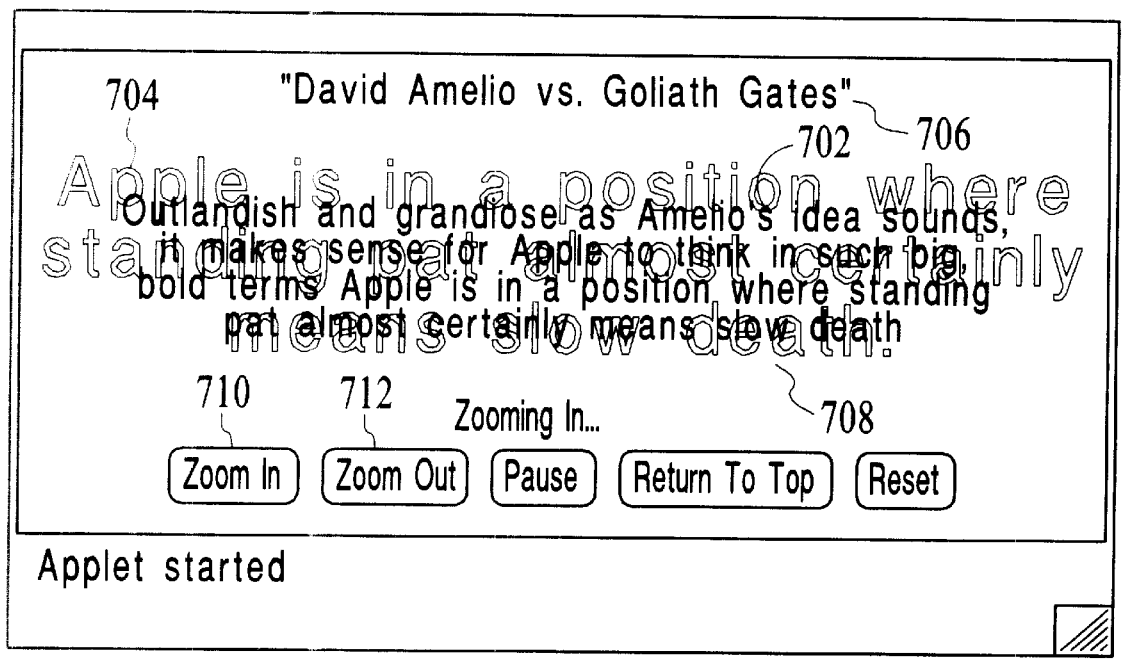
Figure 7F:
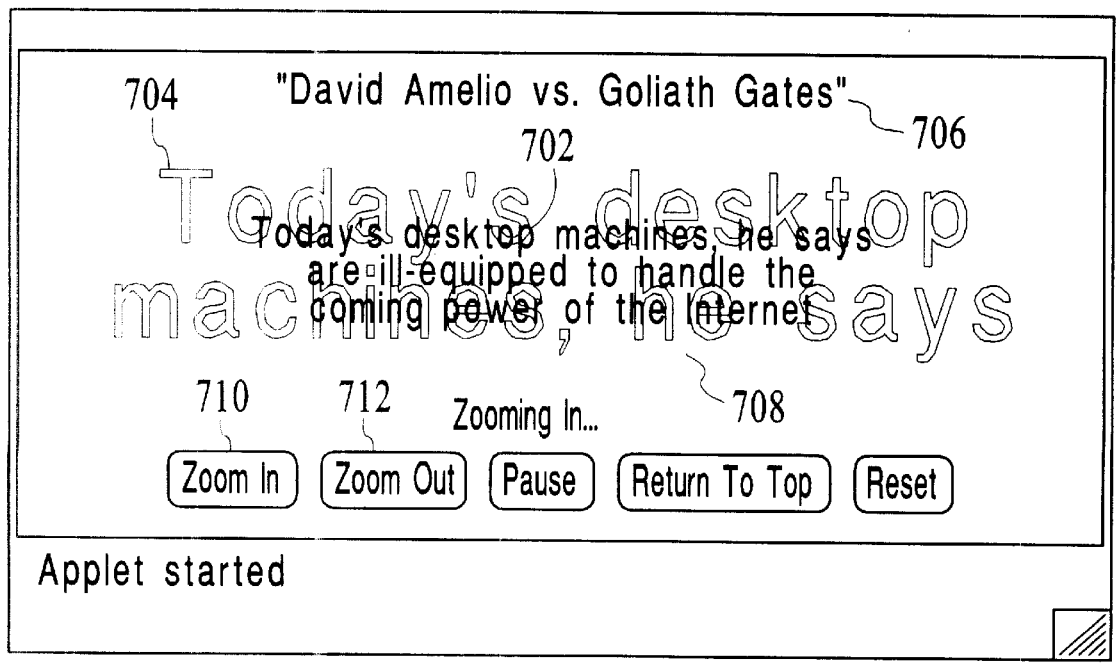

This will reveal, on demand, progressively larger and more well detailed document fragments: sentences, paragraphs and segments. FIGS. 7B, 7D and 7E viewed in this sequence give an indication of how progressively informative contexts are revealed on demand: 7B displays a topic and its content, in FIG. 7D the latter is contextualized to the sentence containing it and in FIG. 7E, this sentence is displayed in the content of the relevant (containing) paragraph. Foreground and background information are always differentiated by hierarchies of type. The transition between displays—e.g., from 7B to 7D, or from 7D to 7E, is accentuated by a visual "zoom" mechanism. In such a hierarchy, about the larger context is always easily available: for instance, further specifics concerning what "he says" (see FIG. 7c) is immediately available by a single click in the display area, the result of which is shown in FIG. 7F.

At any given point of time, and depth of detail, the display uses a combination of visual cues to highlight the information-bearing unit which is in focus, and associate this with the larger context in which it appears in the original source. In particular, properties of type, both static and dynamic, come to convey various aspects of the document analysis: primary focus of attention is denoted by using heavy black typeface; background context, by using translucent text; semantic relatedness, by overlaying the focus and context onto the same display area; different level of attention to detail by visually and perceptibly, zooming in when more detail is requested, and by zooming out when the user retreats back into the default "fly-through, from bird's eye view," mode. Note that while such visual devices are very effective for delivering document highlights, they rely crucially on being able to carry out the layered analysis described with respect to capsule overviews.

The RSVP Viewer is particularly well-suited for deployment in a screen saver mode, in a background window on a desktop machine, or on a large screen projection in communal areas. In any of these situations, a topic or context might catch a reader's peripheral attention, and then they can decide to take a further look. RSVP Viewer thus naturally extends, and fits into, the emerging 'push' model of information delivery.

8C. ViewTool Viewer

Figure 8A:
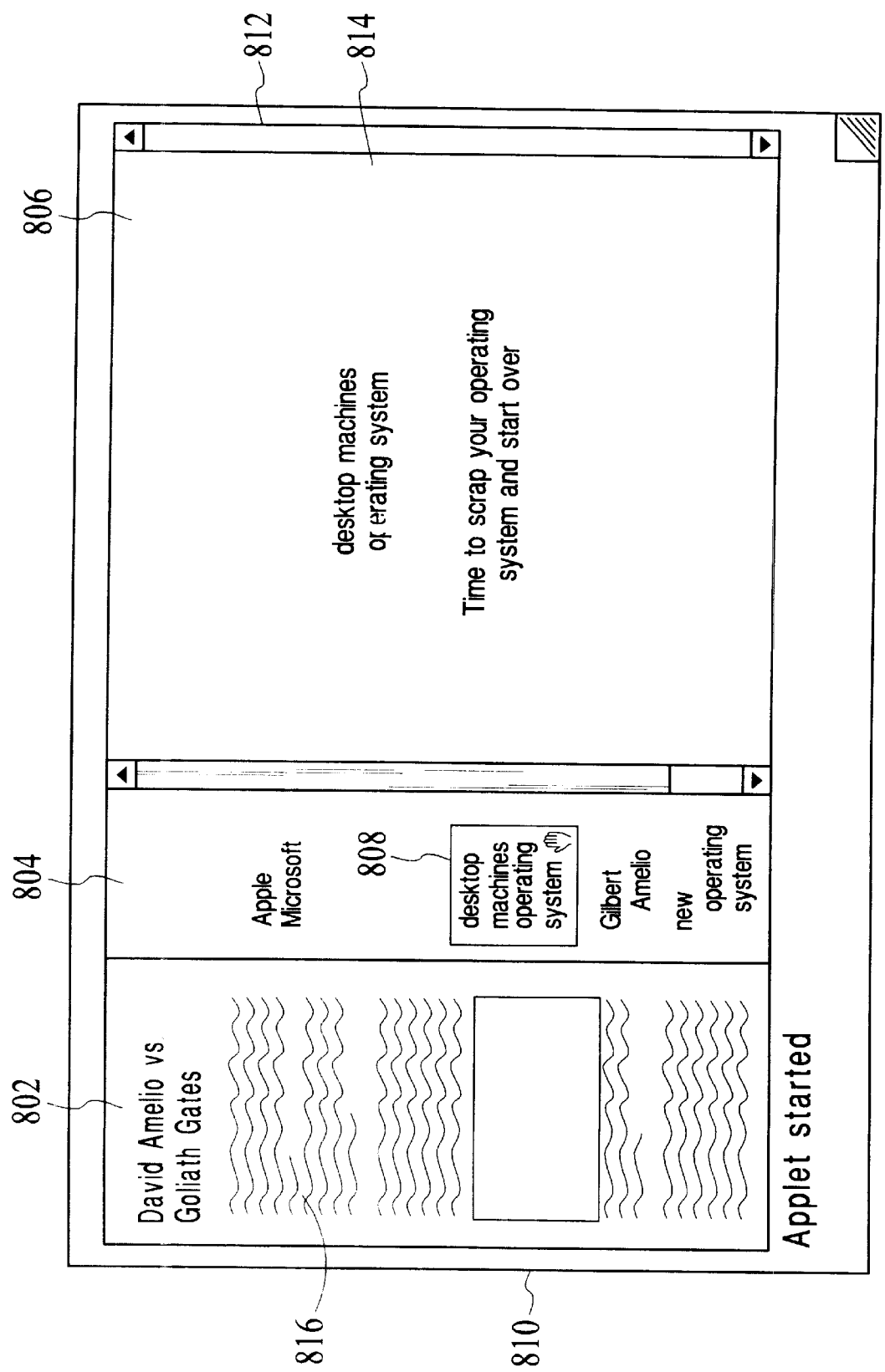
FIGS. 8A–8C are depictions of a ViewTool Viewer in accordance with the present invention.
Figure 8B:
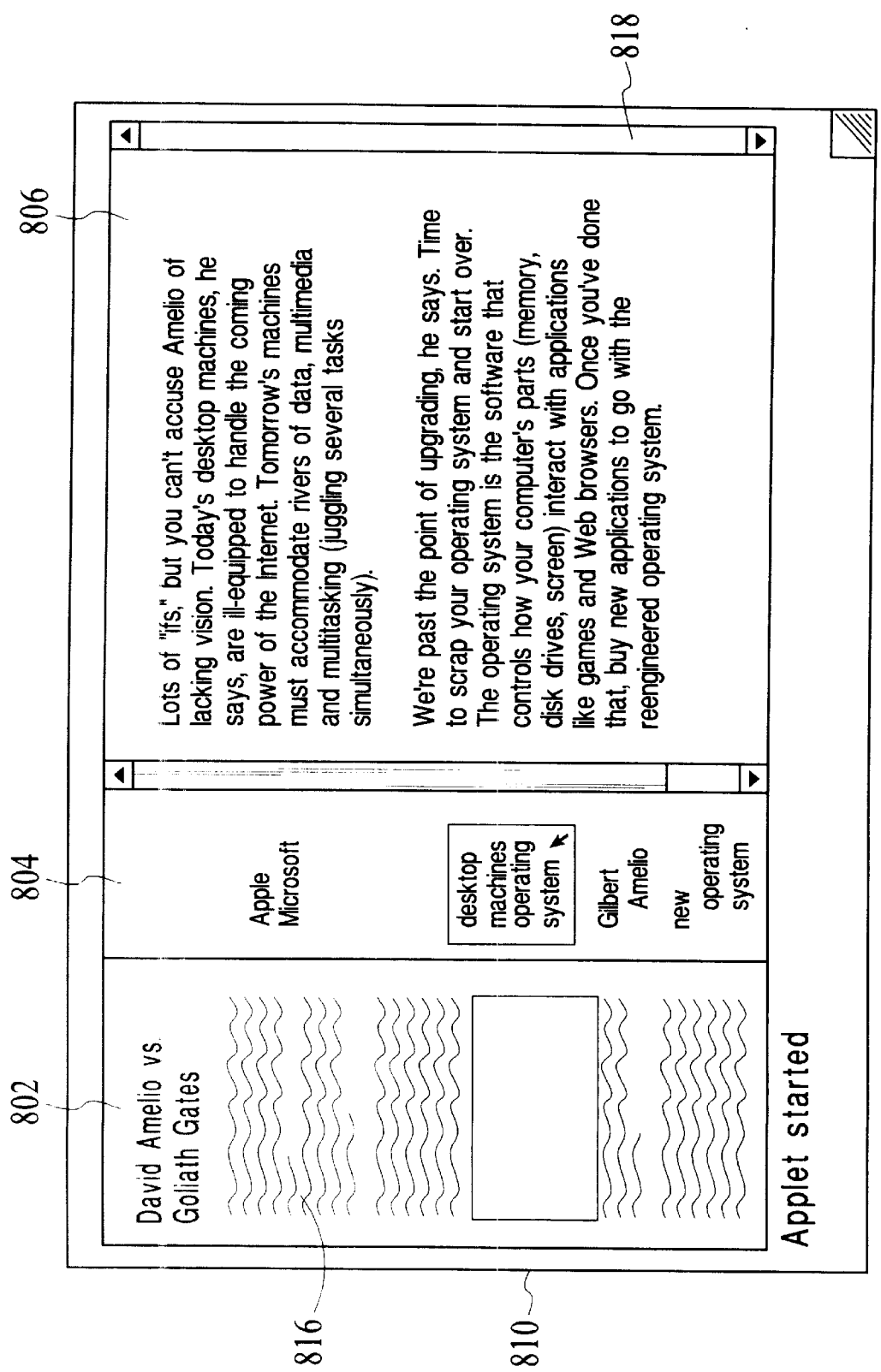
Figure 8C:
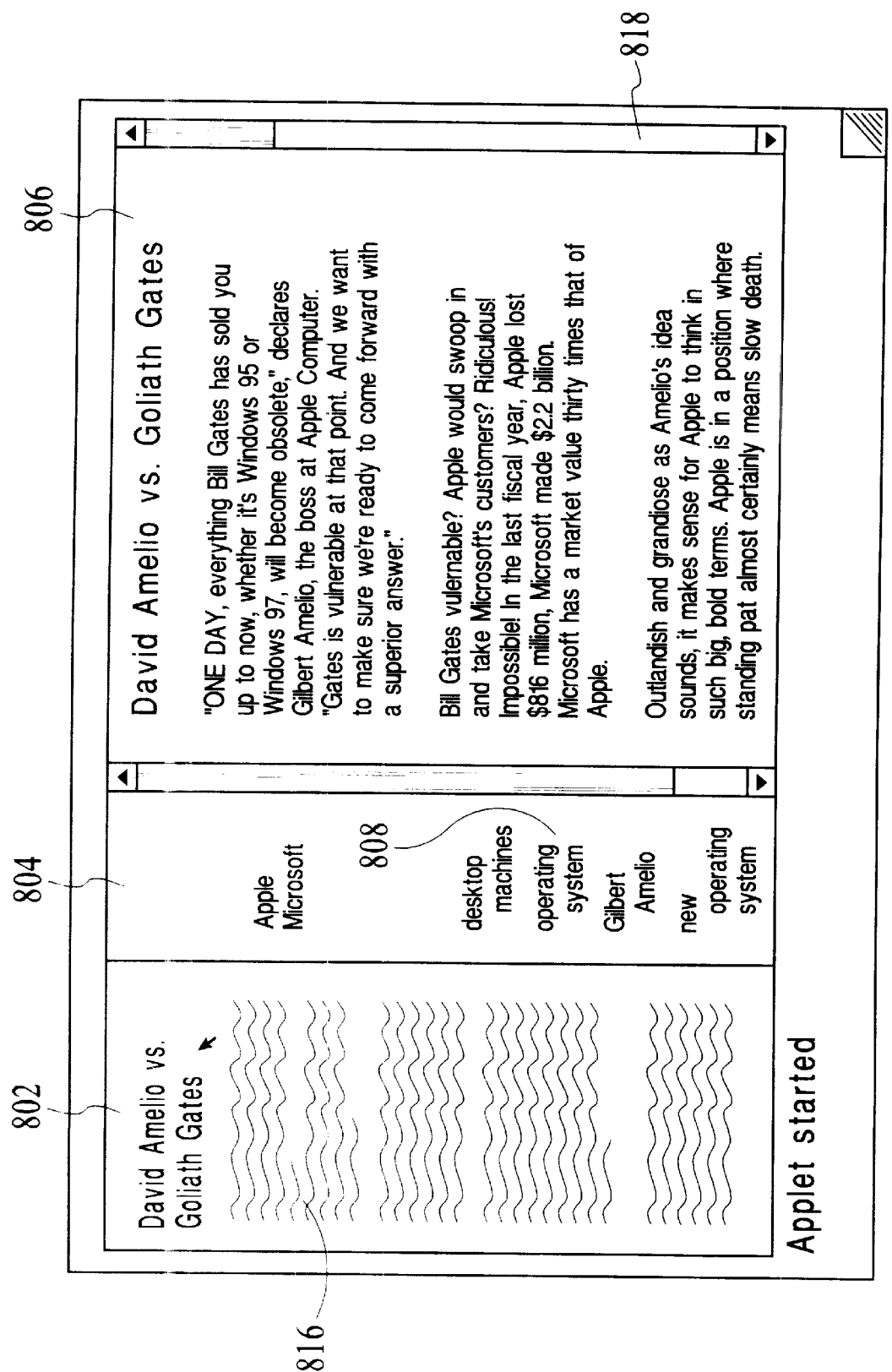

Referring now to FIGS. 8A–8C, what is shown is an embodiment of the ViewTool viewer. The ViewTool viewer freely borrows some of the ideas of RSVP viewer. However, the emphasis here is to present a fuller overview of the salient topic stamps in a document, one place, a single "overview" panel 804. This overview is contextualized to a document 'thumbnail' 816, indicative of the distribution of these highly salient objects in the text. At the same time, a separate 'details' area 806 constantly displays additional information pertinent to the current information-seeking context deployed by the user. The details area 806 is used both for dynamic display of richer contexts, as in the RSVP viewer for providing access to the full text, or topically coherent segments from it, on demand. Thus, the aim of this viewer is to develop a more elaborate notion of context, while maintaining permanent focus on the salient highlights (topic stamps) in the document. The ViewTool viewer further seeks to offer more interactivity to the user, in ways which make the targeted exploration of portions of the document natural and transparent.

The ViewTool viewer places the capsule overview of a document within the context of the document itself This is maintained by synchronized display of discourse segments, topic stamps, and relational contexts in three panels. The whole document 816 is displayed in the left panel; this is deliberately unreadable, and is intended to function as a document thumbnail serving as a contextual referent for the topics presented in the central panel. With the use of an appropriate color coding scheme, it also serves as an indicator of the distribution of topically prominent phrases in the document. The central panel 804 lists the highly salient topic stamps. Contextualization for these is achieved by aligning the topic stamps for a given discourse segment with the textual span of that segment in the thumbnail as indicated by 808 and 810 in FIG. 8A and discussed below. This offers an immediate overview of, for instance, what is being discussed in the beginning of the document, or in the end, or which topics keep recurring throughout, and so forth.

The central panel is sensitive to the user's focus of attention: as the mouse rolls over a topic stamp 804, the discourse segment from which this topic has been extracted is highlighted in the left panel shown at 810. The highlighting also indicates the segmentation of the source documents into topically different, and distinct, text sections. This design makes it easy to do rapid selection of areas of interest in the document, as it is mediated by the topic stamps per segment display. Again, the granularity of analysis and the layered contextual information in the capsule overview make it easy to offer immediate and more detailed information about any given set of topic stamps: simultaneously with highlighting the appropriate discourse segment 810 in the left panel 802, relational contexts for the same set of topic stamps 808 and 812 are displayed cyclically, in RSVP-like fashion 814, in the right panel 806. This ensures that topic stamps are always related with contextual cue phrases. Thus an additional level of detail is made available to the user, with very little 'prompting' on their part. On the other hand, as FIG. 8B illustrates, if it is still the case that the full text of the segment would be required, clicking on its 'proxy' topic stamps 808 (in the middle panel) would display this in the right panel 818. The larger area available there, as well as an automatic readjustment of the size of type, ensures that the text is readable.

Referring now to FIG. 8C, as a natural extension of the same metaphor, clicking on the document proxy 816 in the left panel brings up the full document text in the right panel 820. The full text always uses color markup to indicate, in yet another way, topically salient phrases and their relational contexts.

By always maintaining the larger document context for any grain of information of relevance and interest in the documents, ViewTool viewer is an ideal skimming tool, because it provides additional information that may be important in deciding whether looking more closely at the document would be required. For example, users can get a sense of the size of the document, whether it contains any pictures, and other visual cue features. They can see the density of topics and the relevant ordering of the topics in relation to the different sections of the document. The tool offers the ability to see arbitrarily detailed contextual information relevant to a topic, while leveraging that same containment hierarchy of layered information units to prevent overload.

8S. Viewer's Summary

The viewers in a preferred embodiment can be fully implemented in Java for cross-platform use, and can be deployed in a variety of ways within a suite of intranet tools for collaboration and communication within communities. In one particular example of use, an on-line newspaper has been configured as the primary news source within a learning community. By means of a variety of web spiders and document filters, external news stories are collected and 'published' in the newspaper. RSVP is used for primary delivery of the external news, on a dedicated page, projected on large display in a shared common area. TopicsTicker Viewer offers a brief overview of the latest news on the front page of the newspaper. ViewTool Viewer is available as an alternative browser, for more pro-active and focused access to the document particularly in situations where the newspaper is being viewed in personal workstations. ViewTool Viewer is also used for browsing of personal information, feeds, sent to a document analysis server engine via a simple e-mail protocol. In general, any configuration of viewers can be deployed for personalized 'windows' into continuous news feeds, combining a variety of screen delivery modes.

The notions of temporal typography and dynamic delivery of content mediated via content highlights offer an appealing synergy of form and content, which not only alleviates inevitable (given the current state-of-the-art of text processing technology) shortcomings of summarization technologies today, but also suggests that additional utility, and user satisfaction, can be derived from imperfect analysis technologies—if usability and interface issues are addressed from this perspective.

A system and method in accordance with the present invention is disclosed which can present thematic capsule overviews of documents to users. For each document a capsule overview is derived which will depict the core content of an average length article in a more accurate and representative manner than utilizing conventional techniques. The capsule overviews, delivered in a variety of dynamic presentation modes, allow the user to quickly get a sense of what a document is about, and decide whether they want to read it in more detail. Thus, the system and method greatly facilitate the process of focused navigation into the parts of the document which may be of particular interest to the user. In a preferred embodiment the display of capsule overviews leverage novel presentation metaphors for the dynamic delivery of content. This delivery can be mediated by multilayered abstractions of document content, making heavy use of ideas of temporal typography, in particular for exploiting the interactions between form and content.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A computer readable medium containing programming instructions for dynamically presenting the contents of a plurality of documents on a display, the programming instructions for:

a) receiving a plurality of documents;

b) generating a plurality of capsule overviews corresponding to the plurality of documents by utilizing the following instructions for each document:

1) identifying a plurality of discourse referents in the document;

2) dividing the document into topically relevant document segments;

3) resolving co-referentiality among the discourse referents within, and across, the document segments, wherein the resolving step comprises linking the discourse referents by co-referentiality with each other to assess a frequency with which they appear within the document and to establish prominence;

4) calculating discourse salience values for the discourse referents based upon the resolving step;

5) determining topic stamps for each of the document segments based upon discourse salience values of the associated discourse referents; and 6) providing a capsule overview of the document, constructed from the topic stamps; and c) dynamically delivering document content as encapsulated within the plurality of capsule overviews.

2. The computer readable medium of claim 1 wherein the plurality of capsule overviews include a containment hierarchy.

3. The computer readable medium of claim 2 wherein the containment hierarchy of information-bearing units provides different levels of abstractions of the document.

4. The computer readable medium of claim 3 wherein the abstractions comprise at least one topic stamp which is embedded within a plurality of layers of progressively more informative text fragments related to the document.

5. The computer readable medium of claim 4 wherein the discourse salience values are indicative of the relative importance of the discourse referents.

6. The computer readable medium of claim 5 wherein the document content is delivered via a TopicsTicker viewer.

7. The computer readable medium of claim 2, wherein the containment hierarchy is accessed automatically.

8. The computer readable medium of claim 7 wherein the document content is delivered via a Rapid Serial Visual Presentation viewer.

9. The computer readable medium of claim 8 wherein the instruction for delivering document content (c) further includes the programming instructions for:

(c1) cycling through a plurality of topic stamps and their associated relational contexts for the plurality of documents.

10. The computer readable medium of claim 9 wherein the instruction for cycling (c1) further includes instructions for:

(c1i) selecting a document from the plurality of documents;

(c1ii) selecting a topic stamp from the document from the capsule overview;

(c1iii) selecting a relational context relating to the topic stamp from the capsule overview;

(c1iv) retrieving a canonical form of the topic stamp from the capsule overview;

(c1v) displaying the topic stamp in background and the relational context in the foreground for a time period that is calculated automatically; and (c1vi) repeating steps (c1i)–(c1v) for the plurality of documents.

11. The computer readable medium of claim 10 wherein the topic stamp and relational context zoom in and out.

12. The computer readable medium of claim 10 wherein the time period for display is calculated based on amount of the relational context.

13. The computer readable medium of claim 12 wherein the topic stamp and relational context are displayed at different intensities.

14. The computer readable medium of claim 13 wherein the topic stamp is dark and relational context is translucent.

15. The computer readable medium of claim 7 wherein the document content is delivered via a ViewTool viewer.

16. The computer readable medium of claim 2 wherein the containment hierarchy is accessed manually.

17. The computer readable medium of claim 16 wherein the document content is delivered via a Rapid Serial Visual Presentation viewer.

18. The computer readable medium of claim 16 wherein the document content is delivered via a ViewTool viewer.

19. The computer readable medium of claim 1 wherein the data is displayed via a screen saver.

20. The computer readable medium of claim 1 wherein the data is displayed on a large screen projection.

21. The computer readable medium of claim 1 wherein the data is displayed in a background window on a computer.

22. A system for dynamically presenting the contents of a plurality of documents on a display, comprising:

means for receiving a plurality of documents;

a memory for storing the plurality of documents;

a processor coupled to the memory functioning to generate a plurality of capsule overviews corresponding to the plurality of documents, wherein, for each document, the processor identifies a plurality of discourse referents in the document, divides the document into topically relevant document segments, resolves co-referentiality among the discourse referents within, and across, the document segments, calculates discourse salience values for the discourse referents based upon the resolving, determines topic stamps for each of the document segments based upon discourse salience values of the associated discourse referents, and provides a capsule overview of the document, constructed from the topic stamps; and a display for delivering document content as encapsulated within the plurality of capsule overviews.

23. The system of claim 22, wherein the plurality of capsule overviews include a containment hierarchy.

24. The system of claim 23, wherein the containment hierarchy of information-bearing units provides different levels of abstractions of the document.

25. The system of claim 24, wherein the abstractions comprise at least one topic stamp which is embedded within a plurality of layers of progressively more informative text fragments related to the document.

26. The system of claim 25, wherein the discourse salience values are indicative of the relative importance of the discourse referents.

27. The system of claim 26, wherein the display delivers the document content via a TopicsTicker viewer.

28. The system of claim 23, wherein the containment hierarchy is accessed automatically.

29. The system of claim 28, wherein the display delivers the document content via a Rapid Serial Visual Presentation viewer.

30. The system of claim 29, wherein the Rapid Serial Visual Presentation viewer cycles through a plurality of topic stamps and their associated relational contexts for the plurality of documents.

31. The system of claim 28, wherein the display delivers the document content via a ViewTool viewer.

32. The system of claim 22, wherein the document content is delivered via a screen saver.

33. The system of claim 22, wherein the document content is delivered via a background window on a computer.

34. The system of claim 22, wherein the system is a computer system in communication with a plurality of electronic devices via a network.

35. The system of claim 22, wherein the system is a server in communication with a plurality of client systems via a network.

36. A method for dynamically presenting the contents of a plurality of documents on a display, the method comprising the steps of:

a) receiving a plurality of documents;

b) generating a plurality of capsule overviews corresponding to the plurality of documents, wherein the generating step further includes the steps of:

1) identifying a plurality of discourse referents in the document;

2) dividing the document into topically relevant document segments; and 3) for each discourse referent, linking the discourse referent by co-referentiality to each other within, and across, the document segments to assess a frequency with which it appears within the document thereby determining prominence of the discourse referent; and c) dynamically delivering document content as encapsulated within the plurality of capsule overviews.

37. The method of claim 36, wherein the generating step (b) further includes the steps of:

4) calculating discourse salience values for the discourse referents based upon the linking step;

5) determining topic stamps for each of the document segments based upon discourse salience values of the associated discourse referents; and 6) providing a capsule overview of the document, constructed from the topic stamps.

38. The method of claim 37, wherein the plurality of capsule overviews include a containment hierarchy.

39. The method of claim 38, wherein the containment hierarchy of information-bearing units provides different levels of abstractions of the document.

40. The method of claim 39, wherein the abstractions comprise at least one topic stamp which is embedded within a plurality of layers of progressively more informative text fragments related to the document.

41. The method of claim 40, wherein the discourse salience values are indicative of the relative importance of the discourse referents.

42. A computer readable medium containing programming instructions for dynamically presenting the contents of a plurality of documents on a display, the programming instructions for:

a) receiving a plurality of documents;

b) generating a plurality of capsule overviews corresponding to the plurality of documents, wherein the generating instructions further include the instructions for:

1) identifying a plurality of discourse referents in the document;

2) dividing the document into topically relevant document segments; and 3) for each discourse referent, linking the discourse referent by co-referentiality to each other within, and across, the document segments to assess a frequency with which it appears within the document thereby determining prominence of the discourse referent; and c) dynamically delivering document content as encapsulated within the plurality of capsule overviews.

43. The computer readable medium of claim 42, wherein the generating instruction (b) further includes instructions for:

4) calculating discourse salience values for the discourse referents based upon the linking step;

5) determining topic stamps for each of the document segments based upon discourse salience values of the associated discourse referents; and 6) providing a capsule overview of the document, constructed from the topic stamps.

44. The computer readable medium of claim 43, wherein the plurality of capsule overviews include a containment hierarchy.

45. The computer readable medium of claim 44, wherein the containment hierarchy of information-bearing units provides different levels of abstractions of the document.

46. The computer readable medium of claim 45, wherein the abstractions comprise at least one topic stamp which is embedded within a plurality of layers of progressively more informative text fragments related to the document.

47. The computer readable medium of claim 46, wherein the discourse salience values are indicative of the relative importance of the discourse referents.

* * * * *

UNITED STATES PATENT AND TRADEMARK OFFICE
CERTIFICATE OF CORRECTION

PATENT NO.    : 6,553,373 B2  
DATED         : April 22, 2003  
INVENTOR(S)   : Branimir Boguraev et al.

It is certified that error appears in the above-identified patent and that said Letters Patent is hereby corrected as shown below:

<u>Title page, Item [54] and Column 1, lines 1-9,</u>  
Title, should read: -- METHOD FOR DYNAMICALLY DELIVERING CONTENTS ENCAPSULATED WITH CAPSULE OVERVIEWS CORRESPONDING TO THE PLURALITY OF DOCUMENTS, RESOLVING CO-REFERENTIALITY RELATED TO FREQUENCY WITHIN DOCUMENT, DETERMING TOPIC STAMPS FOR EACH DOCUMENT SEGMENTS --

Signed and Sealed this

Eighteenth Day of May, 2004

JON W. DUDAS  
*Acting Director of the United States Patent and Trademark Office*